US012774163B2

(12) United States Patent
Menz et al.

(10) Patent No.: US 12,774,163 B2
(45) Date of Patent: Oct. 27, 2026

(54) SYSTEMS, METHODS, AND APPARATUSES FOR LOADING, STORING, AND DISPENSING OBJECTS

(71) Applicant: United Parcel Service of America, Inc., Atlanta, GA (US)

(72) Inventors: Ryan Menz, Austin, TX (US); Youngjun Choi, Atlanta, GA (US); Julian Bell, Atlanta, GA (US); Amanda Grace Chu, Marietta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 257 days.

(21) Appl. No.: 18/783,215

(22) Filed: Jul. 24, 2024

(65) Prior Publication Data

US 2025/0033884 A1 Jan. 30, 2025

Related U.S. Application Data

(60) Provisional application No. 63/516,049, filed on Jul. 27, 2023.

(51) Int. Cl.
*A47F 1/12* (2006.01)
*A47F 5/00* (2006.01)
(Continued)

(52) U.S. Cl.
CPC .............. *B65G 1/1371* (2013.01); *A47F 1/12* (2013.01); *A47F 5/0018* (2013.01); *B65G 1/08* (2013.01);
(Continued)

(58) Field of Classification Search
CPC ................................ B65G 1/1371; B65G 1/08; B65G 2203/0233; B65G 1/10; B65G 1/14;
(Continued)

(56) References Cited

U.S. PATENT DOCUMENTS 10,053,288 B1 8/2018 Rawal
10,755,223 B2 * 8/2020 Tu ........................ G06Q 10/083
(Continued)

FOREIGN PATENT DOCUMENTS

CN 106564724 A * 4/2017 ............... B65G 1/04
CN 109243099 A 1/2019
EP 3571143 B1 2/2023

OTHER PUBLICATIONS

European Search Report received for European Application No. 24191110.6, mailed on Dec. 5, 2024, 10 pages.

*Primary Examiner* — Justin Holmes
(74) *Attorney, Agent, or Firm* — Shook, Hardy & Bacon L.L.P.

(57) ABSTRACT

In general, various embodiments of the present disclosure provide systems, methods, apparatuses, technologies, and/or the like for loading, storing, and/or dispensing objects in an automated and/or semi-automated fashion. For example, various embodiments provide a storage system comprising: a frame comprising a shelf; a plurality of doors attached to the frame along a dispensing side, wherein each door can be opened and closed independently through operation of a corresponding release mechanism; a plurality of dividers adjustable to different positions along a length of the shelf to thereby define storage compartments that vary in size along the length of the shelf for storing objects of different sizes; and a controller that, for each storage compartment, is configured to cause operation of the corresponding release mechanism for a series of the plurality of doors corresponding to a dimension of the storage compartment in unison to release an object stored in the storage compartment.

20 Claims, 14 Drawing Sheets

(51) Int. Cl.

| | |
|---|---|
| ***B65G 1/08*** | (2006.01) |
| ***B65G 1/137*** | (2006.01) |
| ***E05F 15/611*** | (2015.01) |
| ***E05F 15/70*** | (2015.01) |
| ***G06Q 10/08*** | (2023.01) |

(52) U.S. Cl.
CPC ............ *E05F 15/611* (2015.01); *E05F 15/70* (2015.01); *G06Q 10/08* (2013.01); *B65G 2203/0233* (2013.01)

(58) Field of Classification Search
CPC .......... B65G 1/02; B65G 1/04; B65G 1/1373; A47F 1/12; A47F 5/0018; E05F 15/611; E05F 15/70; G06Q 10/08; G06Q 10/0833; G07F 11/005; G07F 11/007; G07F 11/06; G07F 11/28
See application file for complete search history.

(56) References Cited

U.S. PATENT DOCUMENTS

| | | | | |
|---|---|---|---|---|
| 11,410,118 | B2 * | 8/2022 | Fee .................... | G07C 9/00896 |
| 11,536,081 | B1 | 12/2022 | Goetz et al. | |
| 2013/0261792 | A1 * | 10/2013 | Gupta .................... | G05B 15/02 700/232 |
| 2020/0002094 | A1 | 1/2020 | Schedlbauer et al. | |
| 2022/0129831 | A1 | 4/2022 | Gil | |

* cited by examiner

SYSTEMS, METHODS, AND APPARATUSES FOR LOADING, STORING, AND DISPENSING OBJECTS

CROSS REFERENCE TO RELATED APPLICATIONS

This application claims priority from U.S. Provisional Patent Application Ser. No. 63/516,049, filed Jul. 27, 2023, the disclosure of which is hereby incorporated herein by reference in its entirety.

TECHNICAL FIELD

The present disclosure is generally related to systems, methods, apparatuses, technologies, and/or the like for loading, storing, and/or dispensing objects in an automated and/or semi-automated fashion.

BACKGROUND

There is frequently a need, such as in a logistics network operation, to transport and dispense objects (e.g., parcels with contents) at different locations while doing so efficiently, precisely, and with a scalable capacity. Traditionally, such processes have relied on a substantial amount of manual handling, which can inherently limit the capacity and adaptability of such operations. Thus, improvements in the automated or semi-automated handling of objects in such contexts are needed.

SUMMARY

This summary is intended to introduce a selection of concepts in a simplified form that is further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, systems, methods, and apparatuses, technologies, and/or the like for loading, storing, and dispensing objects in an automated and/or semi-automated fashion. The embodiments described herein can be implemented in different object-handling environments such as, for example, environments associated with packaging (e.g., of consumer goods), loading/unloading (e.g., of cargo), routing and delivery (e.g., in connection with a logistics network operation), and/or the like. Particular embodiments described herein may be implemented in stationary environments (e.g., stationary facilities) and/or in moving environments (e.g., in vehicles, ships, aircraft, or other mobile transports). In addition, methods of using the aforementioned embodiments are also described herein.

BRIEF DESCRIPTION OF THE DRAWINGS

The present systems, methods, and apparatuses for transporting, storing, depositing, and handling objects are described in detail in connection with the attached drawing figures, which illustrate non-limiting examples of the disclosed subject matter, wherein.

DETAILED DESCRIPTION

This detailed description is provided in order to meet statutory requirements. However, this description is not intended to limit the scope of the invention. Rather, the claimed subject matter may be embodied in other ways, including different steps, different combinations of steps, different operations, different combinations of operations, different elements, and/or a different combination of elements, similar to those described in this disclosure and in conjunction with other present or future technologies and solutions. Moreover, although the term "Operation" may be used herein to identify different elements of methods employed, the term should not be interpreted as implying any particular order among or between different elements except when the order is explicitly described as such.

In general, disclosed herein are various embodiments of a storage system and related components that allow for adaptively, dynamically, and/or modifiability loading, storing, and/or dispensing objects in an automated and/or semi-automated fashion, including in different object-handling environments. For example, various embodiments of the disclosure may be implemented in a logistics network operation in furtherance of downstream routing. Accordingly, various embodiments of the storage system described herein can increase the efficiency, precision, and capacity of an object-handling process or operation, among other benefits. Example embodiments that accomplish the aforementioned benefits are described below in connection with FIGS. 1-10.

The term "object," as used herein, should also be interpreted broadly to include any one or combination of items, articles, substances, and/or the like. For example, an "object" may be a parcel with contents intended for a particular destination in a logistics network.

The term "mobile robotic platform," as used herein, should be interpreted broadly to include any apparatus or configuration of components that is mobile and operates, at least partially, in an automated or semi-automated fashion. For example, a mobile robotic platform may be configured to perform "last distance delivery" to a recipient in a logistics network operation. In addition, a mobile robotic platform described herein may be ground-based, aerial-based, and/or autonomously operated or at least partially autonomously operated. Examples of mobile robotic platforms contemplated herein include, without limitation, multi-leg robots (e.g., bi-leg, quad-leg, and the like), wheel-driven robots, track-driven robots, or other mobile configurations.

The term "logistics network," as used herein, should be interpreted broadly to include any combination of components, systems, technology, persons, locations, and/or the like that operate to transport objects to different destinations, including downstream locations and designated delivery destinations.

Storage System

Figure 1:
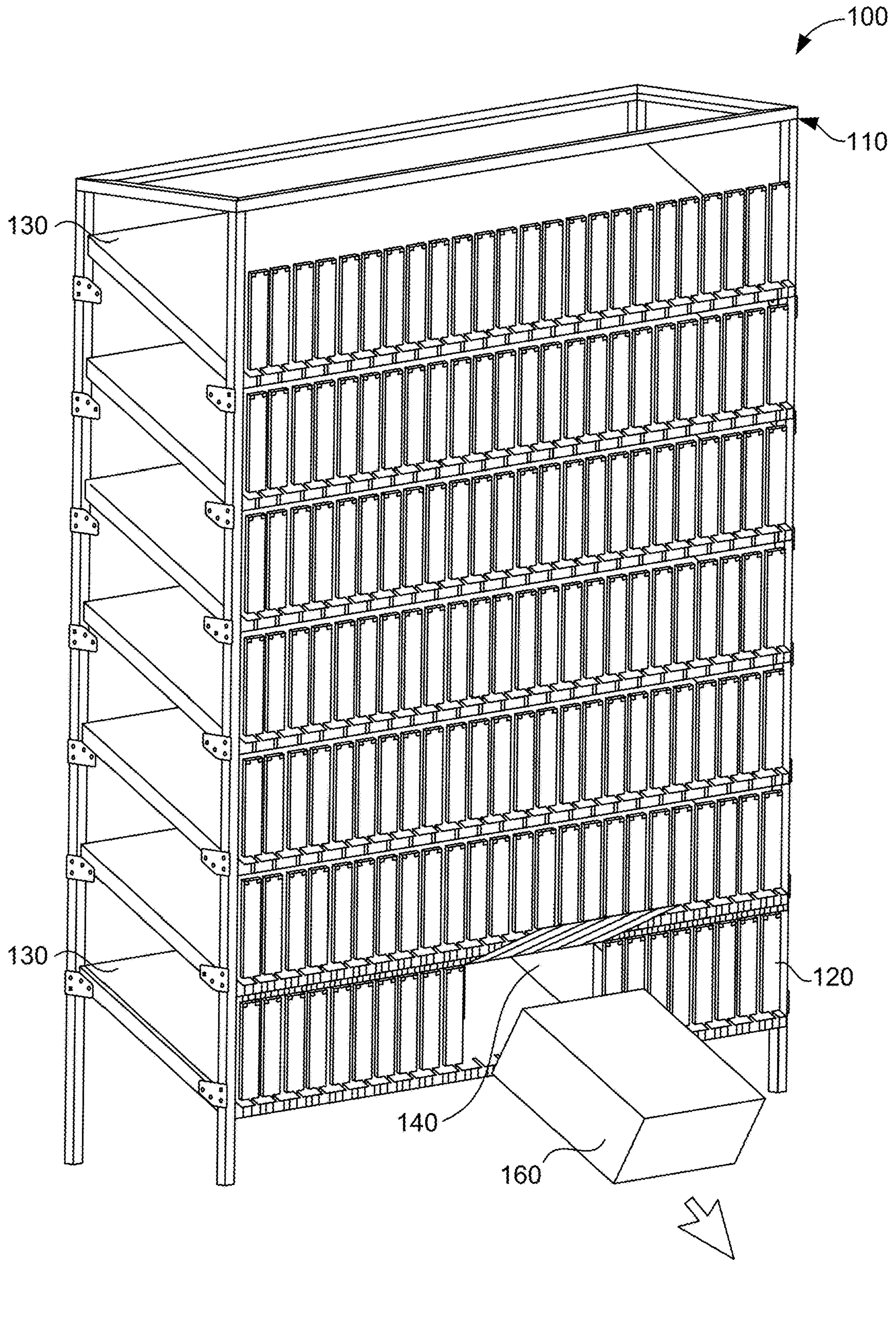
FIG. 1 depicts an example storage system for storing and dispensing objects in accordance with various embodiments of the present disclosure.

Turning to FIG. 1, an example storage system 100 is shown in accordance with various embodiments of the present disclosure. The storage system 100 is adjustable/adaptable to facilitate loading, storing, and dispensing objects of different sizes, shapes, dimensions, types, and/or the like. The storage system 100 includes a frame 110, a plurality of doors 120 (with only a single door being identified in FIG. 1), and a plurality of dividers 140 (with only a single divider being identified in FIG. 1). The frame 110 includes (supports) a plurality of shelves 130. A shelf 130 may include one or more dividers 140 that can be positioned at different locations thereon. In some embodiments, the number of doors 120, shelves 130, and/or dividers 140 can vary depending on the configuration of the frame 110.

In some embodiments, one or more of the shelves 130 of the frame 110 may be angled relative to a surface on which the frame 110 is supported such that the shelves 130 are angled downward in the direction of gravity. This angled orientation may facilitate the dispensing of objects from the storage system 100. For example, such a configuration can facilitate the dispensing of objects (e.g., object 160) from the storage system 100 directly into a storage bag or container, onto a conveyer mechanism, onto a sorting mechanism, onto a mobile robotic platform, and/or the like that is positioned below the storage system 100.

In some embodiments, the mass of the package is the only source of actuating force to push the door open and allow the package to slide out of the shelf. In these embodiments, the angle of the shelf, the material used to manufacture the shelf, and the design and corresponding mass of the door may be designed in tandem to ensure that no more than some specified percentage of packages will fail to actuate the doors 120 purely through their own mass. This design process allows the designer to optimize shelf performance in light of the constraints that apply to each of these variables. (For example, as the angle of the shelf becomes steeper, the force produced by a package to open the door becomes greater; but the volumetric efficiency of the shelf is reduced, and the shelf may become harder to load). This behavior may be modeled by the equations:

$$mg\ \sin(\theta) > F_D\cos(\theta+\alpha) + \mu_1 F_N + \mu_2 F_D\cos(90-\theta-\alpha),\ \text{where}$$

$$F_N = mg\ \cos(\theta) + F_D\sin(\theta+\alpha)$$

$$F_D = \frac{m_d g\sin(\alpha)L_{cm}}{L_I}$$

-continued $$L_I = \frac{\Delta h}{\cos(\theta+\alpha)}$$

with

- m=package mass
- $m_d$=door mass
- g=gravitational acceleration
- θ=shelf angle
- α=door angle (variable)
- $L_{cm}$=distance from door hinge to door center of mass
- Δh=distance perpendicular to shelf between top of package and hinge point
- $\mu_1$=coefficient of friction between package and shelf
- $\mu_2$=coefficient of friction between package and door In one example, a shelf is designed with a shelf angle of 35 degrees relative to horizontal, and a worst-case coefficient of friction of 0.36 between the package material and the shelf material. For these constraints, a door weighing 42 grams will generally allow >99% of packages to successfully pass the doors without jamming.

Additionally, or alternatively, one or more of the shelves 130 may be relatively parallel to the surface on which the frame 110 is supported. For example, the storage system 100 may be used in dispensing objects directly to individuals who reach into the storage system 100 to remove/retrieve the objects. Accordingly, the configuration of the shelves 130 does not necessarily need to be angled for the individuals to reach into the storage system 100 and/or remove/retrieve the objects from the storage system 100.

Additionally, the shelves 130 may include openings located on an opposite side of the frame 170 from where the doors 120 are located (also referred to as object inlet side). Such a configuration allows for objects (e.g., parcels or packages) to be loaded onto the shelves 130 via the openings and securely stored in the storage system 100 by the doors 120. Further, the angling of the shelves 130 may facilitate the stacking of objects during loading and storage.

In particular embodiments, the openings on the object inlet side may be protected with locking doors. These doors may all be of a single width, or of different widths. In some embodiments, these doors are provided in widths that are a whole number multiple of the width of a single door 120 on the dispensing side. Additionally, in some embodiments, these doors may be selectively locked and/or unlocked based at least in part on input from a controller (such as a load controller 740, in FIG. 7), to allow users to access only a specific set of compartments to load a given package, without providing access to other packages elsewhere in the system.

Additionally, or alternatively, one or more of the shelves 130 may include a series of rollers (e.g., rotatable wheels, rails, and/or the like). The rollers may be oriented on a corresponding shelf 130 such that an object supported on the shelf 130 is rolled in the direction of the doors 120, which restrict dispensing the objects when closed. These rollers may be actuated or purely passive in design. In some embodiments, the series of rollers may allow for the shelves 130 to be at a shallower angle relative to a supporting surface while still providing a mechanism for dispensing objects from the storage system 100 using gravity. In other embodiments, the series of rollers may simply allow for an individual to more easily remove and/or retrieve an object from the storage system 100.

Additionally, or alternatively, the frame 110 may include one or more pushing mechanisms coupled to each shelf 130.

For example, each of the pushing mechanisms may comprise a pushing structure that is attached to at least one actuator operable to extend and retract the pushing structure to facilitate shifting and/or dispensing of objects when the doors 120 are opened. In some embodiments, the pushing mechanisms may facilitate dispensing objects from the storage system 100 in instances where one or more of the shelves 130 are relatively parallel to the surface on which the frame 110 of the storage system 100 is supported.

In FIG. 1, the doors 120 are shown positioned along one side of the shelves 130 (e.g., along a lower side relative to a supporting surface). This side may also be referred to as the dispensing side of the storage system 100. The doors 120 may be selectively (e.g., individually and/or in different combinations) opened to dispense objects stored in corresponding storage compartments. In particular embodiments, each of the doors 120 may include a release mechanism to enable the dispensing of the objects. The release mechanism may be used to secure the door 120 in a closed position to retain an object and/or allow the door 120 to move to an open position to dispense the object. Release mechanisms that may be used include, for example, electromagnetic release mechanisms, latching mechanisms, locking mechanisms, or simply controlled operation of rotational actuators attached to the doors 120, among other things.

In various embodiments, the controlled operation of the associated release mechanisms can allow the doors 120 to be opened individually and in different combinations (e.g., in unison) based at least in part on one or more dimensions of a corresponding storage compartment that is defined by the dividers 140. In some embodiments, the release mechanisms attached to the doors 120 can also be controlled by a shelf controller to open the doors 120 and/or to allow for doors 120 to be open. For example, as discussed further herein, the shelf controller may send a signal to the release mechanisms attached to the doors 120 to open the doors 120 and/or to allow the doors 120 to be opened.

An example of a release mechanism that may be used is a latching mechanism based at least in part on a solenoid. When a given solenoid is actuated, a latching mechanism connected to that solenoid is released, and a door 120 secured by that latching mechanism is then free to open. Accordingly, the door 120 can be pushed open, for example, by either the weight of the object behind that door or by some other source of actuation such as rollers or pushers driving the object, an actuator operating directly on the door, and/or the like.

Figure 2A:
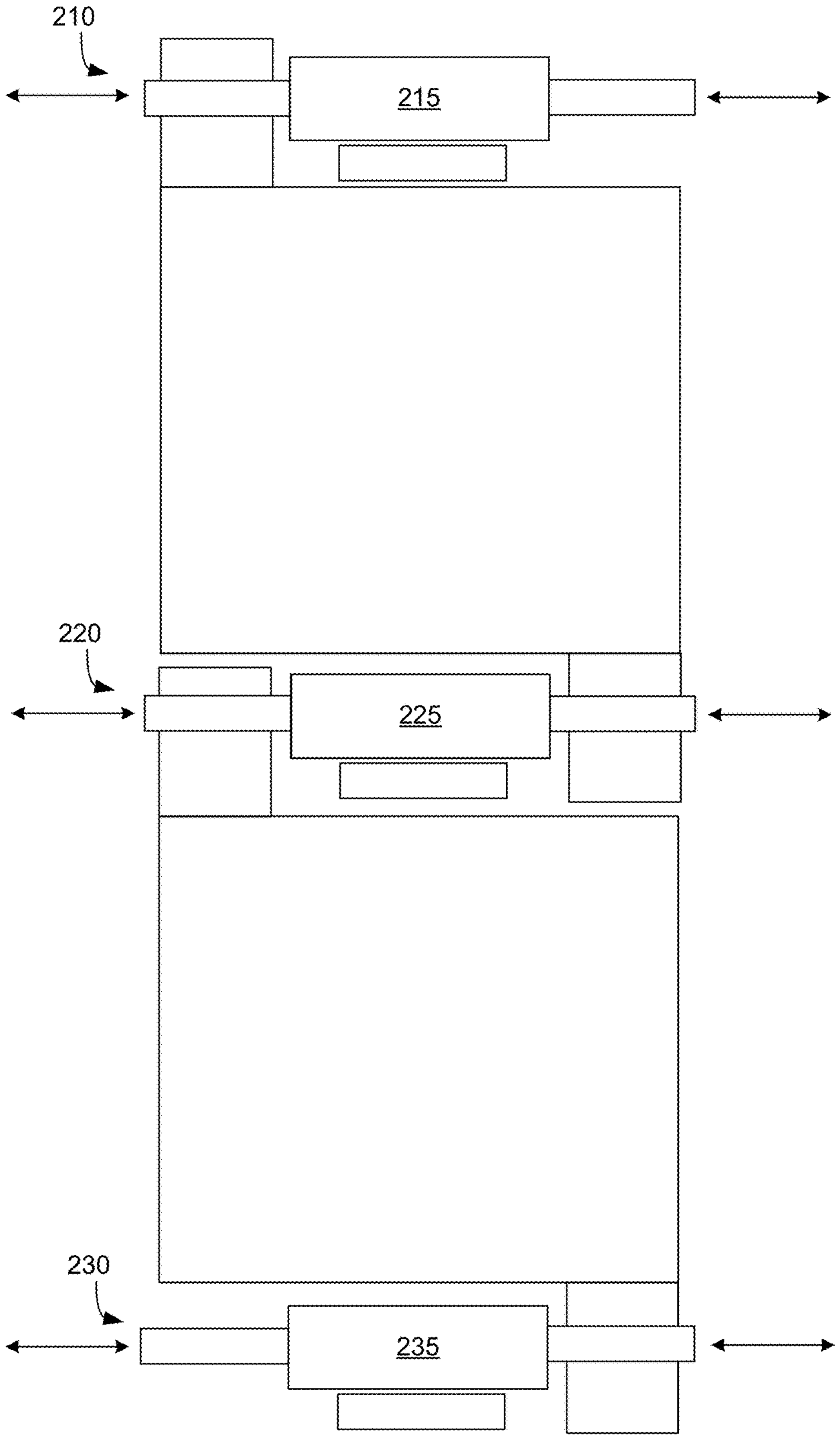
FIGS. 2A-2B depict an example latching mechanism in accordance with various embodiments of the present disclosure.
Figure 2B:
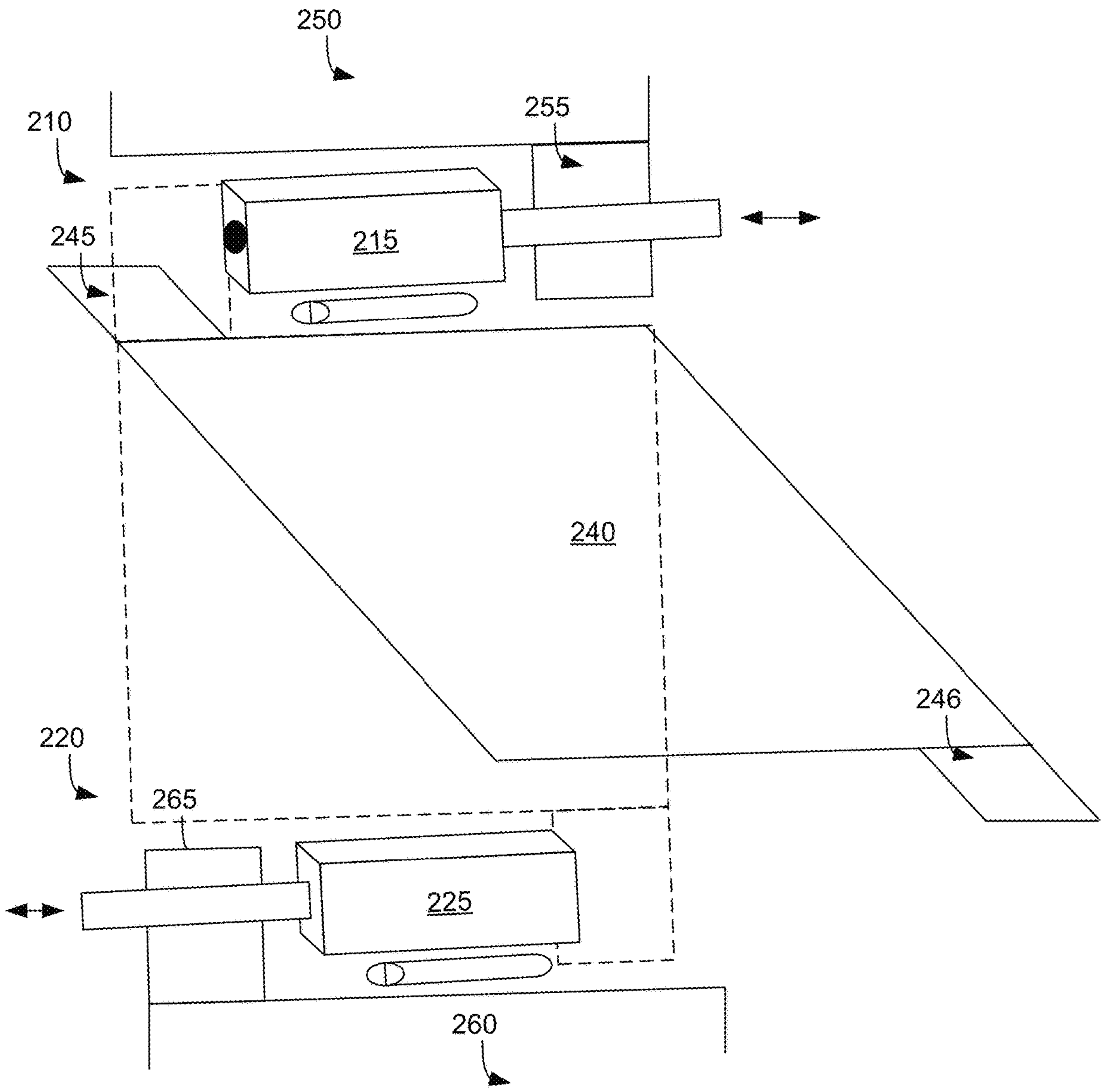

Shown in FIGS. 2A and 2B is an example of latching mechanisms 210, 220, 230 that may be used in various embodiments. As shown in FIG. 2A, each of the latching mechanisms 210, 220, 230 includes a solenoid 215, 225, 235 that is bidirectional and capable of actuating in either direction. For example, as shown in FIG. 2B, the solenoid 215 can move in a first direction to kick open the top finger 245 of a first door 240 that is located below the latching mechanism 210 to allow the first door 240 to swing open. In some embodiments, the movement of the solenoid 215 may actuate a mechanism, such as an angled kicker attached to the solenoid 215 for example, to force the first door 240 open. However, the movement of the solenoid 215 in the first direction does not release the bottom finger 255 of a second door 250 that is located above the latching mechanism 210 and still prohibits the second door 250 from swinging open. In addition, the solenoid 225 of the latching mechanism 220 located below the first door 240 can move in a first direction to release the bottom finger 246 of the first door 240 to unlock the first door 240 and allow the first door 240 to swing open. While the movement of the solenoid 225 in a second direction can kick open the top finger 265 of a third door 260 that is located below the latching mechanism 220 to allow the third door 260 to open.

The doors 120 may have different configurations in different embodiments. For example, a door 120 may be pivotally coupled to the housing of the storage system 100 through the integration of one or more hinges to pivot outward and/or inward. In another example, a door 120 may be coupled to the housing through the integration of a track so that the door 120 can slid. In another example, a door 120 may be coupled to the housing through the integration of a roller-door mechanism so that the door 120 can roll. In another example, a door 120 may comprise rigid material sections joined together to form a sheet that is rigid in two directions, but flexible in another direction, thereby allowing the door 120 to roll up and down to facilitate the open and closed positions. In another example, a door 120 may comprise an iris-style mechanism that includes rigid panels, flexible materials, or other elements that enable the door 120 to transition between a closed position and an open position.

Figure 3:
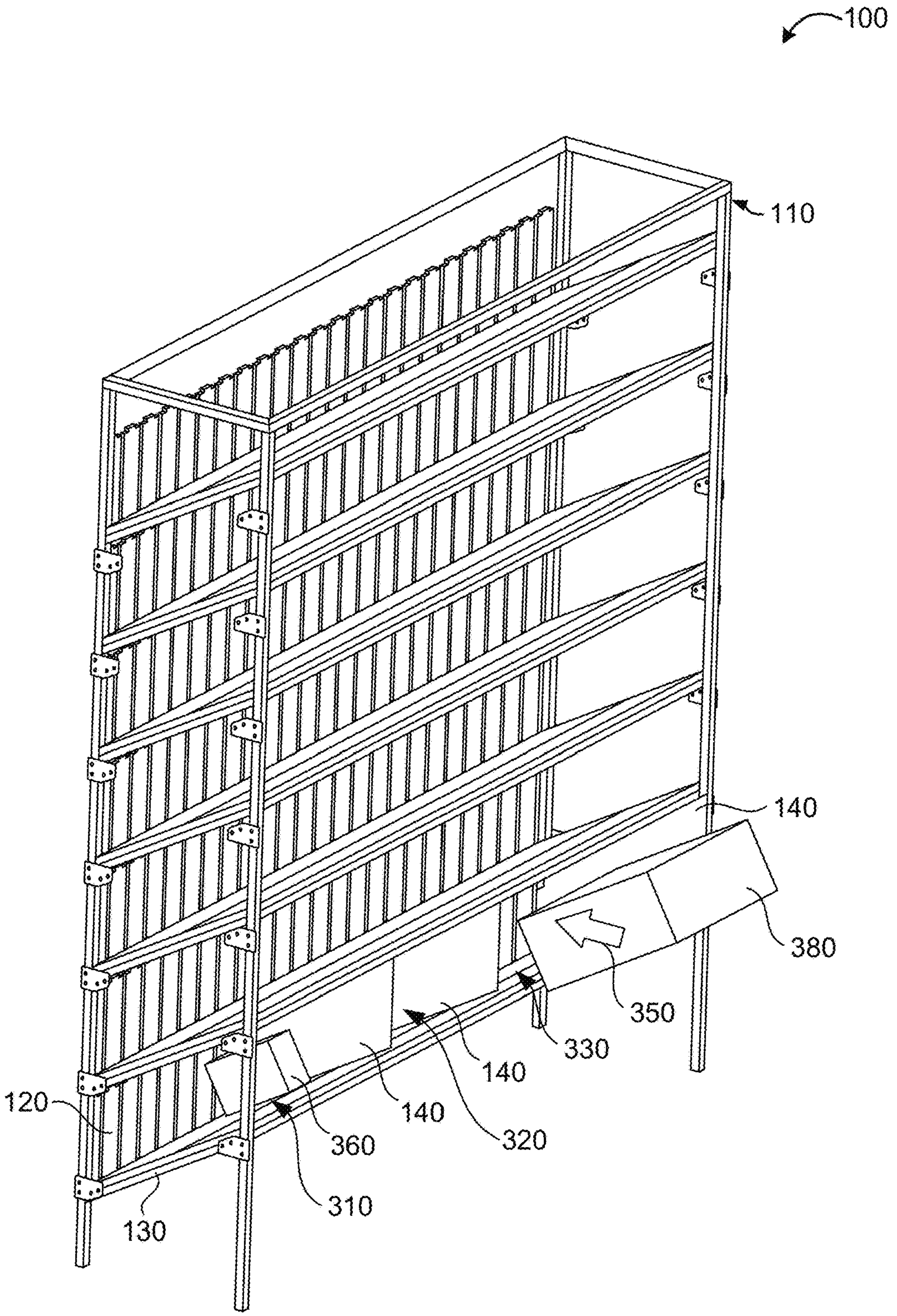
FIG. 3 depicts another example storage system for storing and dispensing objects in accordance with various embodiments of the present disclosure.

FIG. 3 demonstrates how various embodiments of the dividers 140 may be placed along a shelf 130 to partition the shelf 130 into distinct storage compartments 310, 320, 330. For example, the dividers 140 may be of various types such as extendable dividers, slidable dividers, foldable dividers, pivoting dividers, inflatable dividers, expandable dividers, and/or like. Depending on the type of dividers 140 used, the dividers 140 may be placed (e.g., slid, inserted, etc.) along the shelf 130 at different positions to define the distinct storage compartments 310, 320, 330.

Accordingly, the dividers 140 may define distinct storage compartments 310, 320, 330 that vary in size (e.g., width) to accommodate objects 360, 380 of different sizes (e.g., parcels or packages of different sizes) to be stored in the distinct storage compartments 310, 320, 330. In addition, the dividers 140 may be aligned along the shelf 130 so that they are positioned on the shelf 130 in between doors 120. The storage system 100 may then allow the stored objects 360, 380 to be dispensed by opening a corresponding series of doors 120 that are associated with the dimensions of the storage compartment 310, 320, 330. For example, the storage system 100 may facilitate opening a series of doors 120 that corresponds to one or more dimensions (e.g., a width) of the storage compartment 310, 320, 330 to dispense the object 360, 380 stored therein.

For example, FIG. 3 depicts how an object 380 may be placed onto a shelf 130 of the storage system 100 for storage. Here, the dividers 140 are positioned along the shelf 130 to define a unique storage compartment 330 that securely stores the object 380. Once the dividers 140 have been positioned, the object 380 is loaded into the storage compartment 330 from the side of the shelf 130 with the opening 350 (e.g., object inlet side). The object 380 may then subsequently be dispensed by operating a series of doors 120 corresponding to one or more dimensions (e.g., a width) of the storage compartment 330.

Therefore, use of the dividers 140 in defining distinct storage compartments 310, 320, 330 of various sizes, along with the selectively operable doors 120 in various embodiments may allow for the storage system 100 to accommodate a higher density of objects 360, 380, as well as a greater diversity of objects 360, 380 (e.g., in terms of dimensions and shapes). Thus, various embodiments of the storage system 100 may increase the efficiency, capacity, and throughput of an object-handling operation, among other benefits.

Figure 4A:
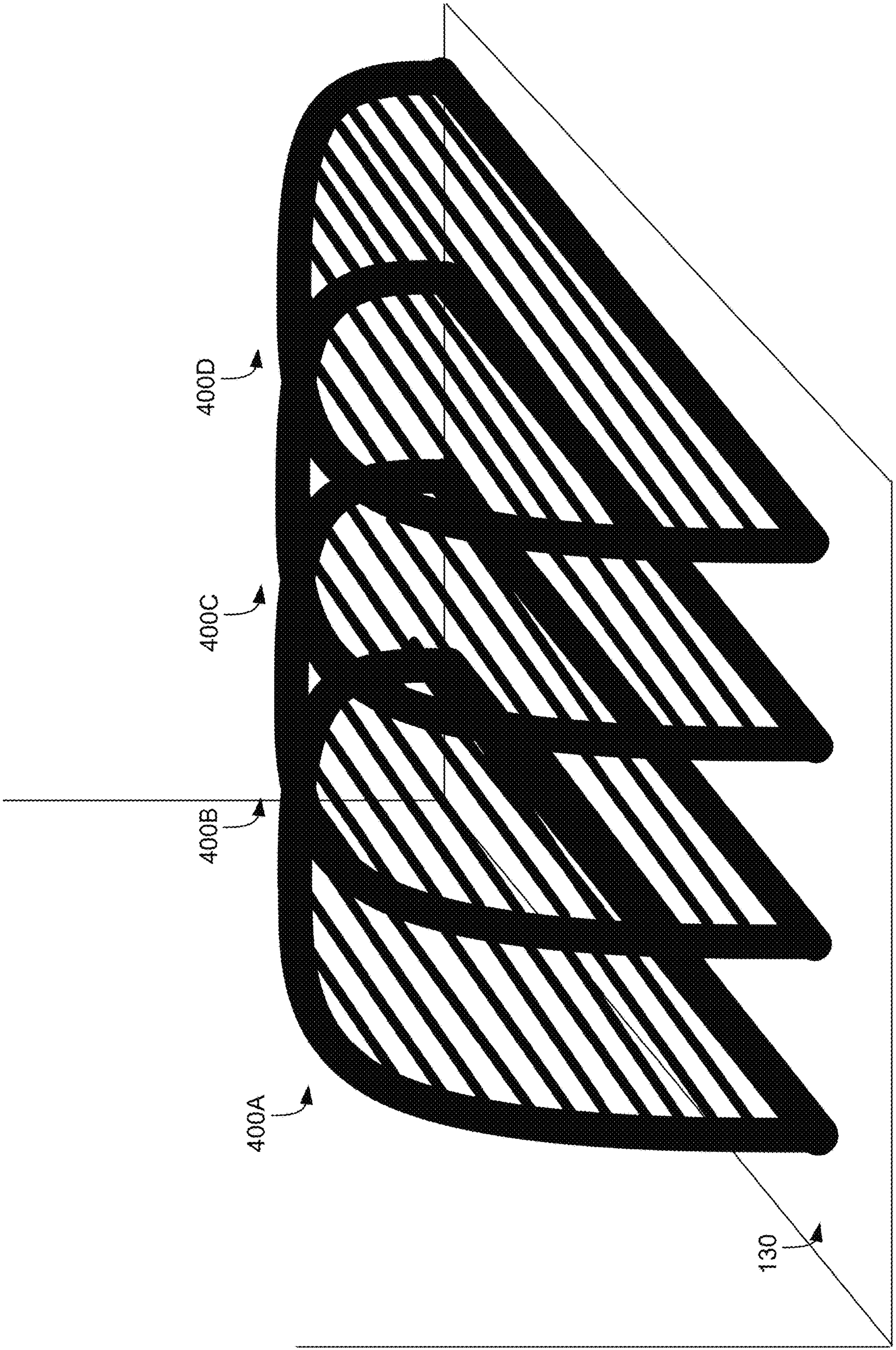
FIGS. 4A-4D depict example dividers in accordance with various embodiments of the present disclosure.
Figure 4B:
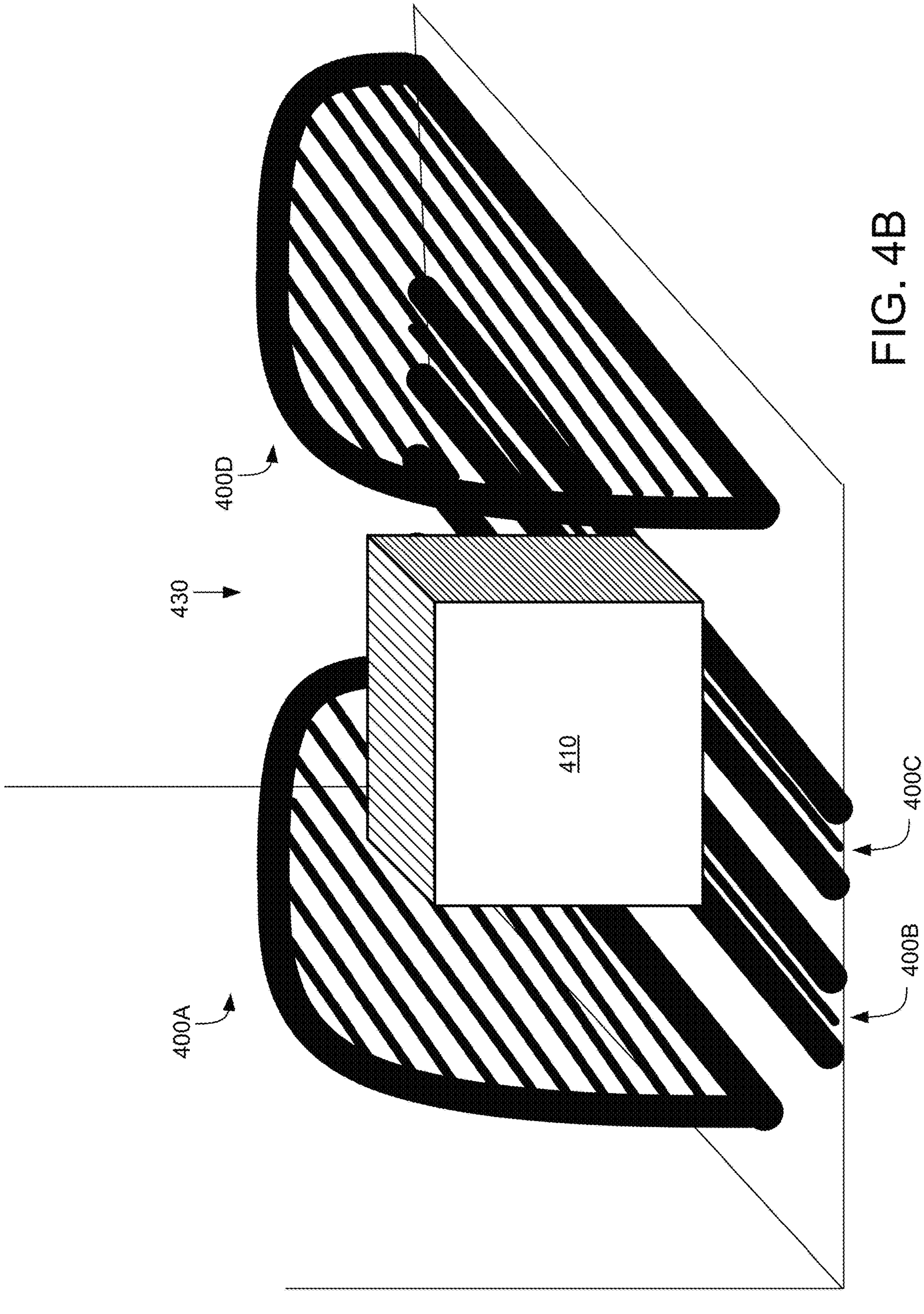
Figure 4C:
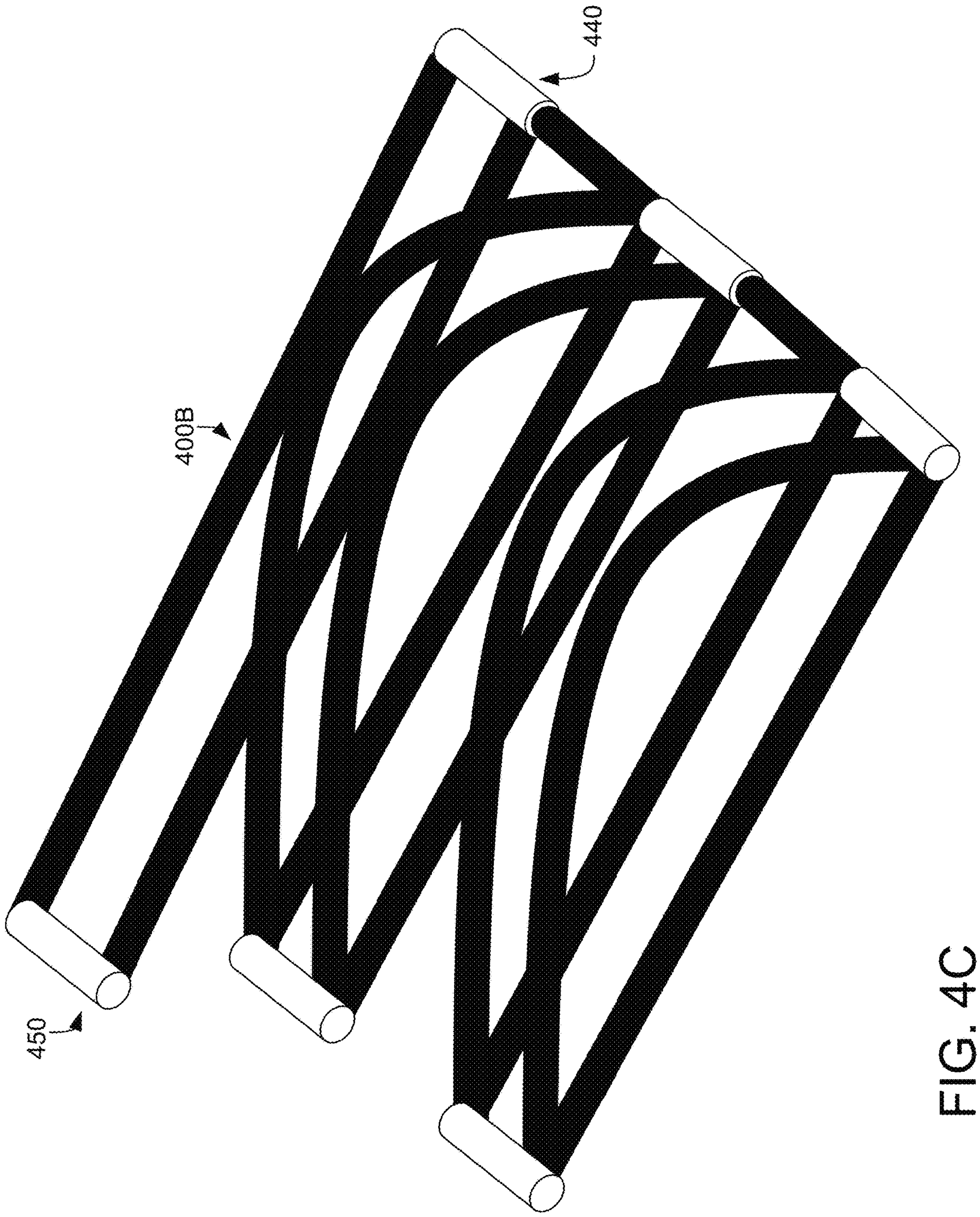

FIGS. 4A-4D depict examples of a type of divider 140 that can be used in various embodiments of the storage system 100 that may be referred to as a spring-down divider 400A, 400B, 400C, 400D. Spring-down dividers 400A, 400B, 400C, 400D are generally constructed of a pliable material suitable for the manufacture of flexural elements, such as thin metals (steels) or fatigue-resistant polymers such as polypropylene. Implementations of a spring-down divider 400A, 400B, 400C, 400D is shown in FIGS. 4A-4C. For example, the dividers 400A, 400B, 400C, 400D shown in FIG. 4A are installed along a shelf 130 so that the spring-down dividers 400A, 400B, 400C, 400D are aligned between the doors 120 for the shelf 130.

As an object 410 is loaded onto the shelf 130, the object 410 is placed on top of and/or in between one or more of the spring-down dividers 400A, 400D. As shown in FIG. 4B, for any spring-down divider 400B, 400C for which the object 410 is placed on top of, the weight of the object 410 compresses the spring-down divider 400B, 400C down to essentially lay flat against the shelf 130. For the immediately adjacent spring-down dividers 400A, 400D for the which the object 410 lies between, these spring-down dividers 400A, 400D serve as dividers that define the storage compartment 430 in which the object 410 is stored.

In particular embodiments, the spring-down divider 400B, as shown in FIG. 4C, is designed so that a first end 440 of the spring-down divider 400B is attached to the shelf. For example, the first end 440 of the spring-down divider 400B may be attached at the back of the shelf 130 in which objects are loaded. The second end 450 of the spring-down divider 400B may be free with some type of mechanism such as a roller to allow the spring-down divider 400B to roll towards the front of the shelf 130 and the doors 120 to flatten out once an object is placed on the spring-down divider 400B.

Figure 4D:
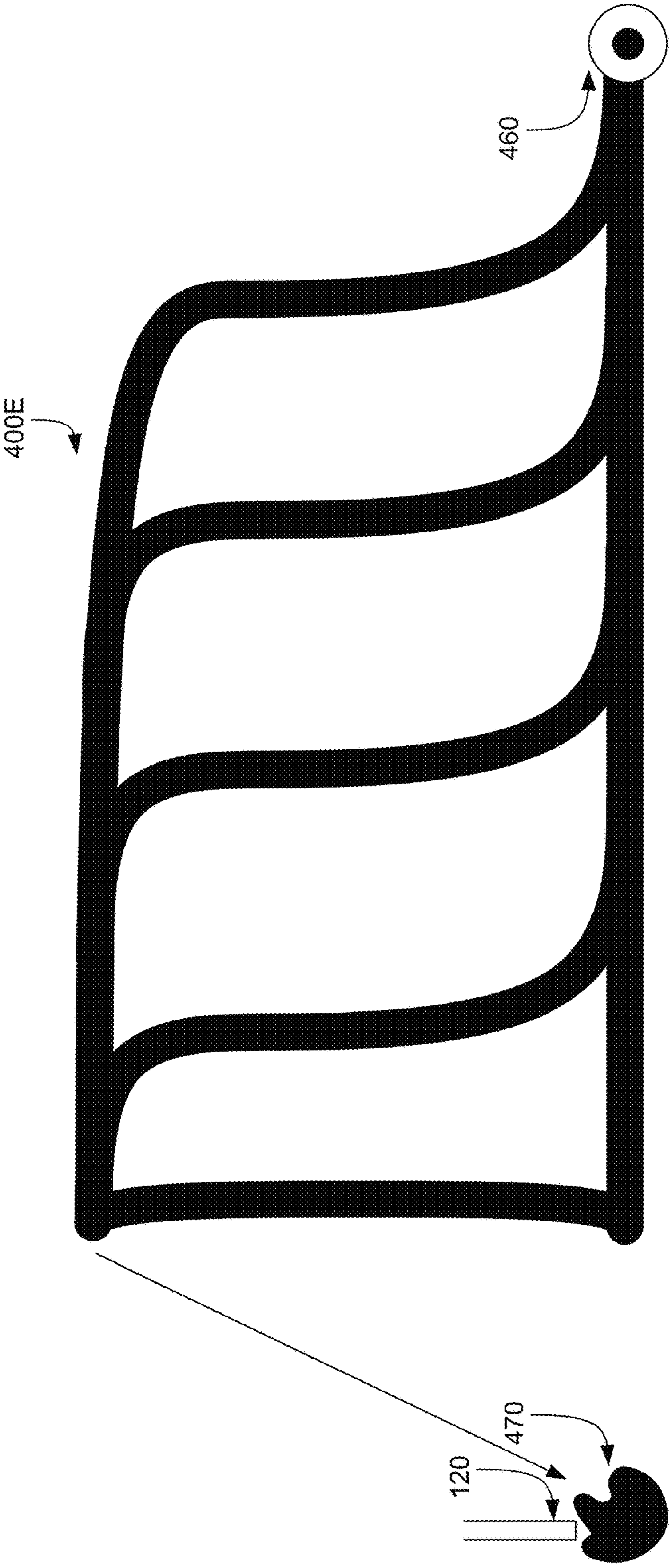

In other embodiments, the spring-down divider 400E, as shown in FIG. 4D, may be configured so that when the spring-down divider 400E is compressed, it may be preferably latched into position by a mechanism. A wide variety of mechanisms may be used to perform this latching. For example, a rotary ratchet 460 at the back of the flexure (near the point of loading). In addition, simple latches, such as a latch with a dashpot 470, may be used at the front of the flexure and/or bistable spring mechanisms that cause the spring-down divider 400E to "snap" between the fully upright and fully compressed states. This latching mechanism may prevent the spring-down divider 400E from providing an upwards force against the package loaded on top of it, which could interfere with package dispensing.

Therefore, in various embodiments, the spring-down dividers 400A, 400B, 400C, 400D, 400E may enable loading objects onto a shelf 130 of the storage system 100 without the need for (manually) positioning the dividers along the shelf 130 to define the different storage compartments for the shelf 130. As a result, the spring-down dividers 400A, 400B, 400C, 400D, 400E may facilitate increased speed at which objects can be loaded onto the shelf 130. In addition, the spring-down dividers 400A, 400B, 400C, 400D, 400E may also enable external sensing systems to detect the state of a given spring-down divider 400A, 400B, 400C, 400D, 400E which can allow for the shelf controller to infer what locations along the shelf are occupied by an object or not. For example, a Hall effect sensor may be used to detect a magnet embedded in the body of the spring-down divider 400A, 400B, 400C, 400D, 400E.

Figure 5A:
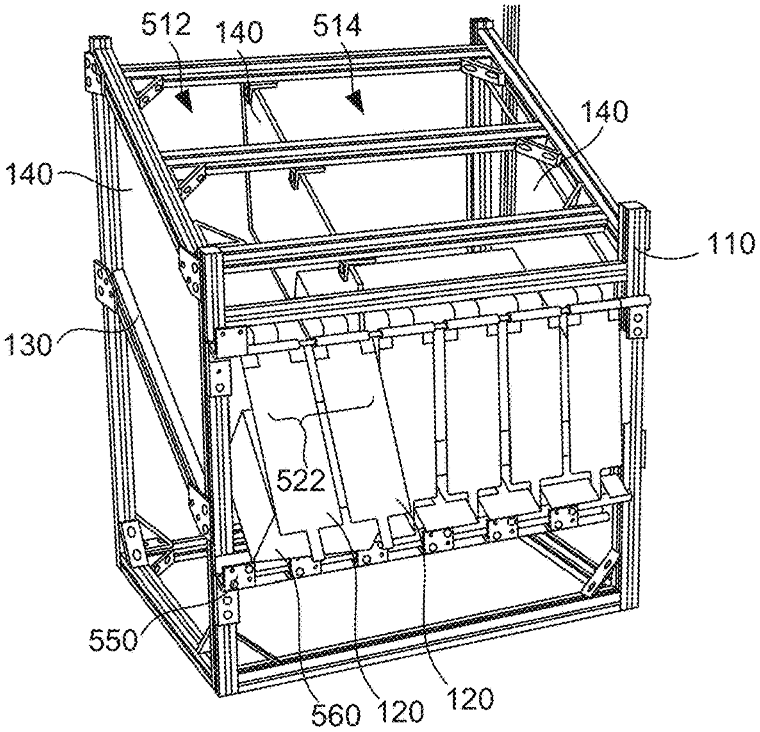
FIGS. 5A and 5B depict example storage compartments that have been defined for a storage system in accordance with various embodiments of the present disclosure.
Figure 5B:
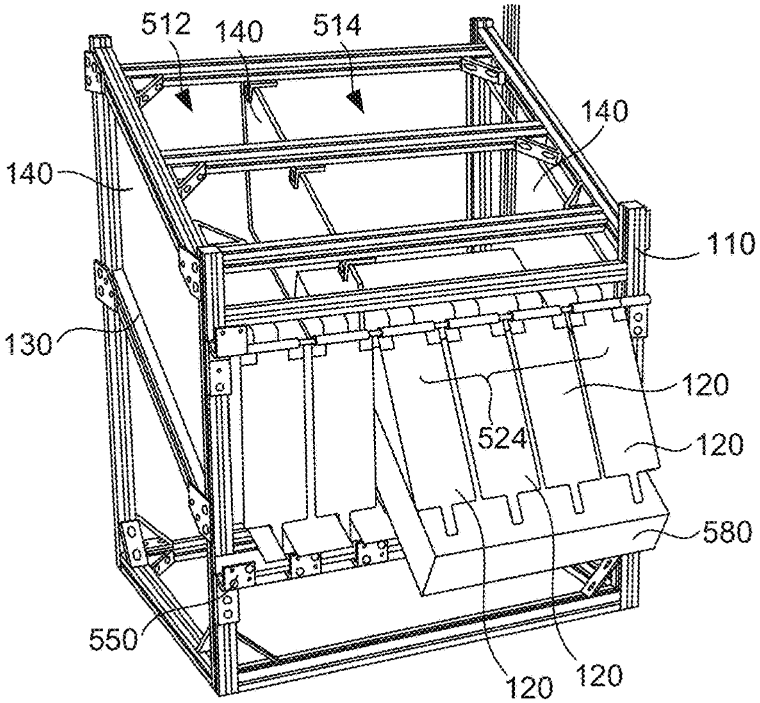

Turning to FIGS. 5A and 5B, example storage compartments that have been defined for a storage system 100 are provided according to various embodiments. Here, the storage system 100 includes a frame 110 and a shelf 130 having a first storage compartment 512 and a second storage compartment 514 that have been defined by positioning dividers 140 along the shelf 130. In addition, the storage system 100 includes a first series of doors 522 associated with the first storage compartment 512 and a second series of doors 524 associated with the second storage compartment 514. The number of doors 120 included in the first series of doors 522 corresponds to one or more dimensions of the first storage compartment 512 to allow dispensing of an object 560 stored in the first storage compartment 512. Likewise, the number of doors 120 included in the second series of doors 524 corresponds to one or more dimensions of the second storage compartment 514 to allow dispensing of an object 580 stored in the second storage compartment 514.

For example, in FIG. 5A, the first series of doors 522 associated with the first storage compartment 512 includes two doors 120 that have been opened through operation of one or more release mechanisms 550 attached to the doors 120 to allow an object 560 with a width dimension similar to the first storage compartment 512 to be dispensed from the first storage compartment 512. Similarly, in FIG. 5B, the second series of doors 524 associated with the second storage compartment 514 includes four doors 120 that have been opened through operation of one or more release mechanisms 550 attached to the doors 120 to allow an object 480 with a width dimension similar to the second storage compartment 514 to be dispensed from the second storage compartment 514.

In some embodiments, the storage system 100 is configured so that a series of doors that operates in conjunction with a storage compartment is automatically assigned based at least in part on the placement of the dividers 140 that define the storage compartment. For example, the dividers 140 may be placed along the shelf 130 to create the first storage compartment 512, which corresponds to a width of a pair of doors 120 as shown in FIG. 5A. As discussed further herein, based at least in part on the placement of the dividers 140, the pair of doors 120 may automatically be assigned as the first series of doors 522 to the first storage compartment 512 in connection with the holding/dispensing functionality. As a result, when the object 560 stored in the first storage compartment 512 is ready to be dispensed, the first series of doors 522 is either manually and/or mechanically operated through the operation of the one or more release mechanisms 550.

Looking at FIG. 5B, a similar release operation is shown being performed via the storage system 100 for the second storage compartment 514 associated with the second series of doors 524 that includes four doors 120. Accordingly, the four doors 120 correspond to the width of the second storage compartment 514 to allow the object 580 with a similar width to be dispensed from the second storage compartment 514. This capability of the storage system 100 in various embodiments to store and dispense objects 560, 580 of different sizes, shapes, dimensions, and/or the like, and to dynamically optimize the shape of storage compartments 512, 514 to match the sizes, shapes, dimensions, and/or the like of those objects 560, 580 can reduce unused space. Further, this capability in various embodiments allows the storage system 100 to transfer objects with greater efficiency, adaptability, and capacity, among other benefits.

Example Environments of Use

Figure 6:
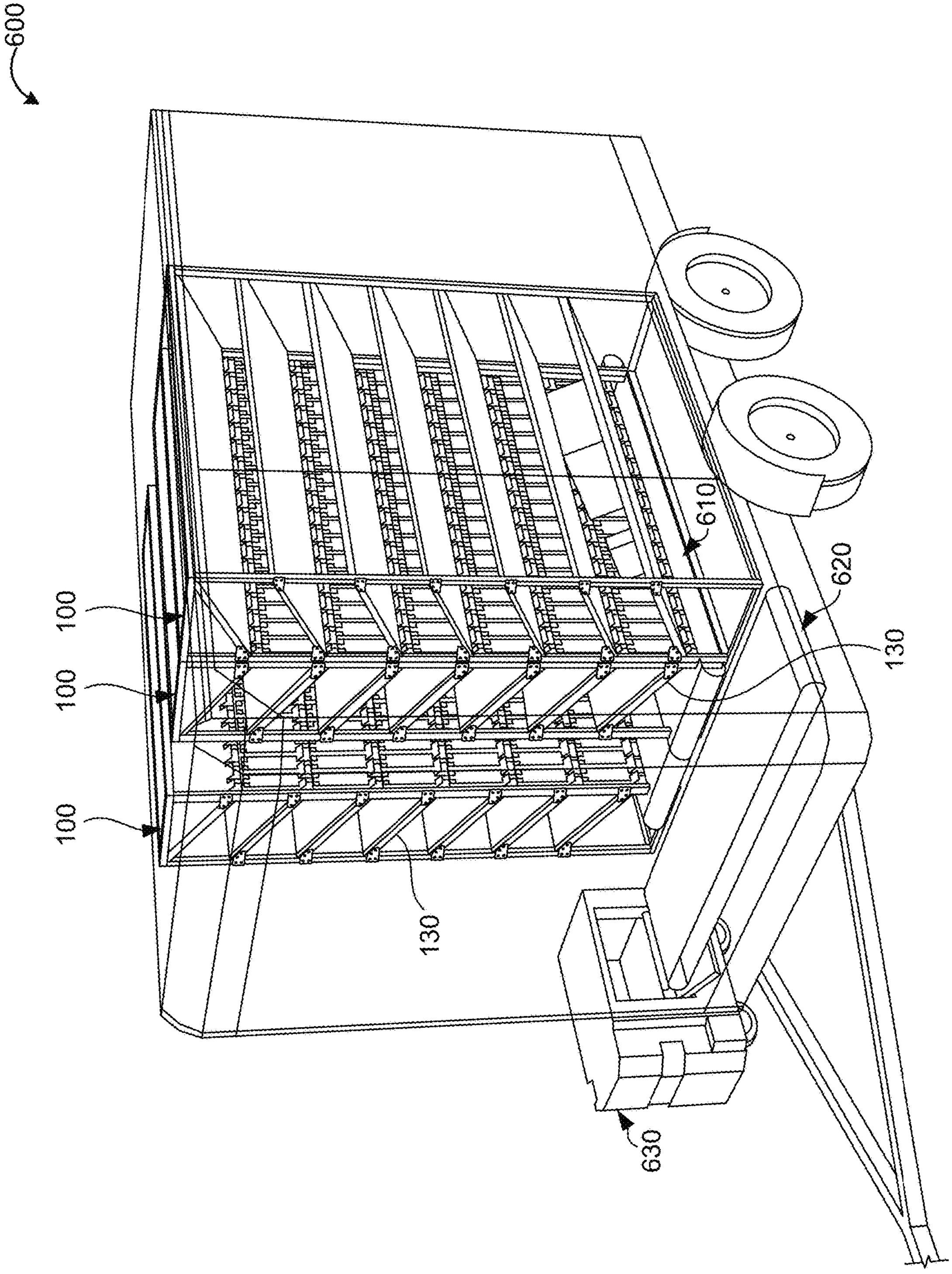
FIG. 6 depicts another example storage system for storing and dispensing objects that is integrated into a mobile transport in accordance with various embodiments of the present disclosure.

Turning to FIG. 6, an example environment of use is provided that involves a mobile transport 600 that includes a plurality of storage systems 100 according to various embodiments. In addition to the storage systems 100, the mobile transport 600 also includes first and second conveyor mechanisms 610, 620 that can carry objects dispensed from the storage systems 100 to a downstream location, in this case a mobile robotic platform 630. For example, the mobile robotic platform 530 may be configured to perform a last-distance delivery through an automated or semi-automated operation. A last-distance delivery can be understood as a delivery of an object over a final distance (segment of a route) to a final delivery destination for the object.

In particular embodiments, the plurality of storage systems 100 is coupled to a repositioning system integrated into the mobile transport 600 that can be operated to reposition each of the storage systems 100 to different locations in the mobile transport 600. For example, the repositioning system may involve actuated tracks on which each of the storage systems 100 sit and can be driven side-by-side to open space for the doors 120 of each of the storage systems 100 over the first conveyor mechanism 610 to allow the doors 120 to dispense objects onto the first conveyor mechanism 610. Once dispensed, the first conveyor mechanism 610 carries the objects down to the second conveyor mechanism 620, and the second conveyor mechanism 620 carries the objects to the mobile robotic platform 630.

This ability to reposition each of the plurality of storage systems 100 relative to the first conveyor mechanism 610 allows for objects (e.g., parcels or packages) stored in different parts of the plurality of storage systems 100 to be dispensed onto the first conveyor mechanism 610, and subsequently to the second conveyor mechanism 620, for transport to the mobile robotic platform 530. For example, the repositioning system can shift one or more of the plurality of storage systems 100 to one side, allowing a remaining storage system 100 to have the ability to position its doors 120 to dispense objects onto the first conveyor mechanism 610. This ability to reposition the storage systems 100 to different locations internally may increase space efficiency and adaptability within the mobile transport 600.

This same repositioning system may also be used to provide access to the backs of storage systems 100 for the purpose of loading objects into the storage systems. For instance, during the preload process that takes place in a logistics facility, or during a field preload when the storage systems are recharged with additional volume.

Depending on the embodiment, the storage systems 100 described herein may be enclosed within a mobile transport 600 (e.g., a vehicle, an airplane, etc.), or may be enclosed within a stationary enclosure (e.g., a drop box, facility, etc.). For example, a storage system 100 can be placed at an access point inside or outside of a building in which the storage system 100 is loaded with objects that are then dispensed to individuals who visit the storage system 100 to retrieve the objects from the storage system 100. In particular embodiments, the storage system 100 may be configured so that each side of the storage system 100 is enclosed to ensure the security of the objects while stored in the storage system 100. For example, the storage system 100 may be configured with a door covering the rear (e.g., object inlet side) of the storage system 100 that is secured (e.g., locked) by individuals who are tasked with loading objects into the storage system 100. Similarly, the storage system 100 may be configured with one or more wall coverings on the sides of the storage system 100 to prevent access to the shelves 130 of the storage system 100.

An individual may visit the storage system 100 and provide some type of identification for an object that is being stored in the storage system 100. For example, the storage system 100 may be equipped with some type of input mechanism such as a keypad, barcode scanner, optical scanner, and/or the like through which the individual provides the identification for the object. In turn, the storage system 100 in various embodiments may then actuate a series of doors for the storage system 100 corresponding to a storage compartment storing the object to dispense the object to the individual.

In another example, a storage system 100 may be used in an environment in which there may be a concern with the security of stored objects with respect to loading other objects into the storage system 100. For example, the storage system 100 may be used in an environment in which multiple parties who are independent of each other may be using the storage system 100 for storing and dispensing objects. Therefore, these separate parties may be concerned with the other parties having access to their objects that are loaded in the storage system 100 when these other partiers are loading their objects into the storage system 100.

Accordingly, the storage system 100 may be configured in some embodiments to have differently sized, externally accessible locking doors on the rear of the storage system 100 (e.g., on the object inlet side of the storage system 100) to allow for secure loading of objects into the storage system 100). For example, the storage system 100 may be configured with different sized doors on the rear of the storage system 100 on different shelves 130 to accommodate different sized storage compartments on the shelves 130. As a specific example, the storage system 100 may be configured to have doors on the rear of the storage system 100 for a first shelf 130 in which the doors are the size of a series of doors that includes a single front door 120, a second shelf 130 in which the doors are the size of a series of doors that includes two front doors 120, a third shelf 130 in which the doors are the size of a series of doors that includes three front doors 120, and so forth.

Dividers 140 may be pre-installed to define storage compartments on each of the shelves 130 according to the different sizes of the doors on the rear of the storage system 100. In this way, the storage system 100 can accommodate different sized storage compartments that can be loaded by a particular party, while preventing access to other storage compartments that may be storing objects for other parties. With that said, the storage system 100 may be configured so that the sizes of the doors on the rear of the storage system 100 can be adjusted for the different shelves 130 to accommodate different sized storage compartments to account for changes in object volume, uses by the different parties, and/or the like.

In some embodiments, a particular party may be given access (e.g., assigned) to particular doors on the rear of the storage system 100 in which to store and dispense objects, along with mechanisms (e.g., keys, access codes, etc.) needed to access the particular doors. This way, the particular party can only access its assigned doors to store objects in the storage system 100 but cannot access the doors assigned to other parties.

Additionally, or alternatively, a third party may provide information on an object the party would like to store in the storage system 100, and the storage system 100 may then subsequently provide access to a particular door on the rear of the storage system 100. For example, the storage system 100 may provide some type of mechanism such as a keypad, barcode scanner, optical scanner, and/or the like that a party (e.g., individual thereof) can use in providing information on an object to be stored in the storage system 100. As a specific example, the storage system 100 may provide an optical scanner that the party can use to scan a quick response (QR) code providing the dimensions of the object. In turn, the storage system 100 may use the dimensions in identifying a storage compartment that is available and can store the object, and then opening the door on the rear of the storage system 100 for the identified storage compartment.

Control System Architecture

Figure 7:
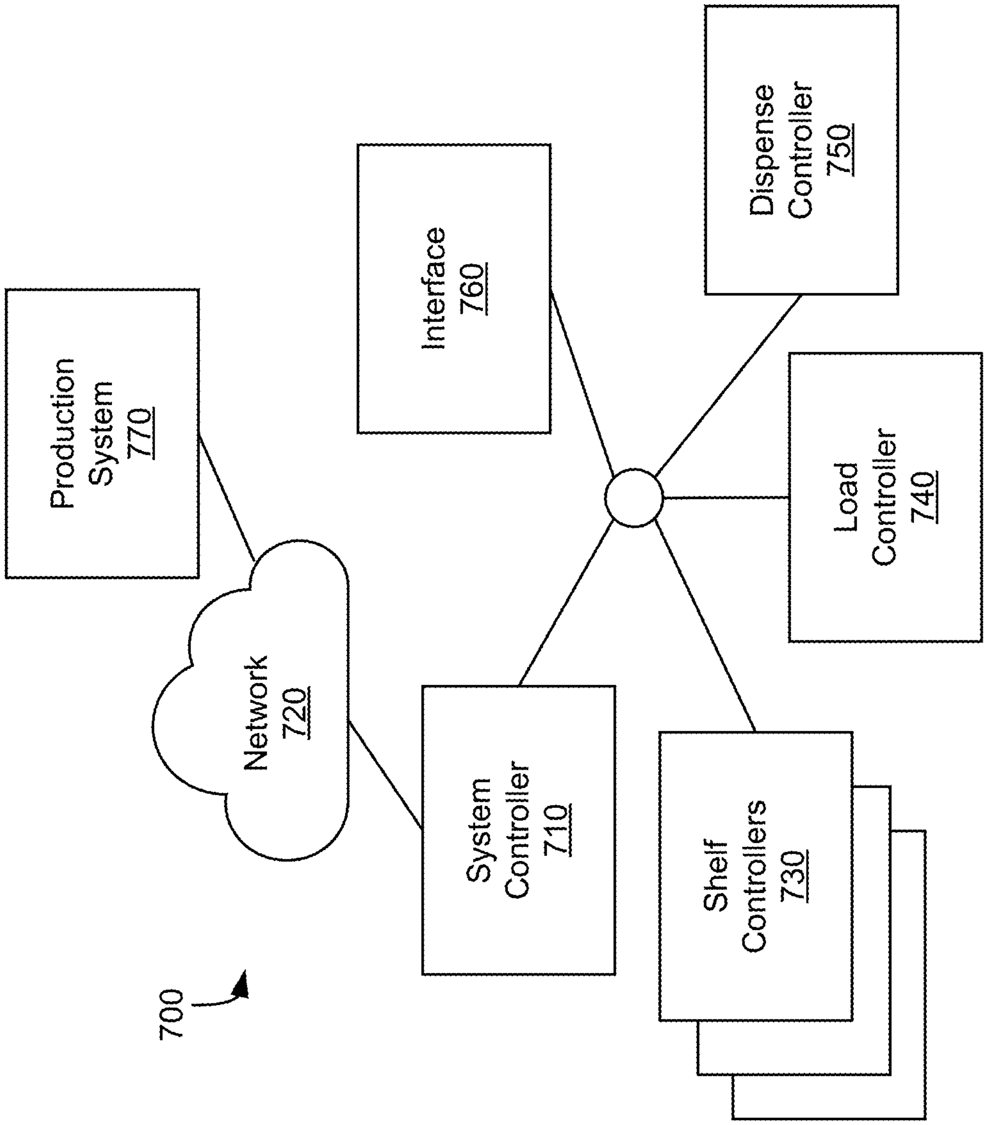
FIG. 7 depicts an example control system architecture suitable for supporting the operation of various embodiments of the present disclosure.

Turning to FIG. 7, an example of a control system architecture 700 is provided that is suitable for supporting the operation of various embodiments of the storage system 100. The control system architecture 700 includes a system controller 710 that operates to handle the overall loading and dispensing of objects to and from the storage system 100. In some embodiments, the system controller 710 may be configured as part of the storage system 100. For example, the storage system 100 may include a separate, secure drawer, shelf, and/or the like in which the system controller 710 is installed. In other embodiments, the system controller 710 may be installed within the environment in which the storage system 100 operates. For example, the system controller 710 may be installed within a mobile transport 600 in which the storage system 100 is installed and used.

The control system architecture 700 may further include a load controller 740. Like the system controller 710, the load controller 740 may be installed as part of the storage system 100 or within the environment in which the storage system 100 operates. In various embodiments, the load controller 740 assists in loading objects into the storage system 100 by providing aspects that allow for the storage system 100 to recognize the objects being loaded into the storage system 100. In some embodiments, the storage system 100 may provide some type of mechanism such as a keypad, barcode scanner, optical scanner, and/or the like to allow an individual to identify an object that is being loaded into the storage system 100. For example, the object may have a shipping label with a barcode that the individual can scan using the barcode scanner. In turn, the load controller 740 may receive identifying data for the object via the mechanism. In particular embodiments, the load controller 740 may be configured to operate the mechanism.

In other embodiments, the load controller 740 may be in communication (e.g., interface), via the system controller 710, with some type of production system 770 over a network 720 such as a local area network (LAN), an intranet, an extranet, the Internet, and/or the like. For example, the storage system 100 may be used within a logistics network to store, transfer, and dispense parcels to customers of a logistics organization. The production system 770 may be a part of the logistics network that is used in tracking parcels for the logistics organization. Here, the production system 770 may communicate with the system controller 710, and the load controller 740, over the network 720 and provide identifying data for an object that is being loaded into the storage system 100.

In other embodiments, an individual may be provided with another tool such as a mobile application through which the individual can enter identifying data for an object being loaded into the storage system 100. The mobile application may then communicate the identifying data to the load controller 740. For example, the mobile application may communicate the identifying data over a network 720 to the system controller 710, and the load controller 740, via the production system 770. Additionally, or alternatively, the mobile application may provide a scannable code, such as a QR code, that the individual scans via a mechanism provided by the storage system 100 to enter the identifying data.

The control system architecture 700 may further include one or more shelf controllers 730. For example, a shelf controller 730 may be provided for each shelf 130 found in the storage system 100. Again, the shelf controller(s) 730 may be installed as part of the storage system 100 or within the environment in which the storage system 100 operates. In various embodiments, the shelf controller(s) 730 assist in loading objects into the storage system 100 by identifying storage locations of the objects within the storage system 100; detecting the state of shelf components, such as dividers and doors; and dispensing or allowing for loading of objects by actuating doors, as described herein.

In particular embodiments, the space provided on a shelf 130 may be partitioned into cells. For example, the space provided on a shelf 130 may be partitioned into cells that align with the doors 120 used for dispensing objects stored on the shelf 130. Accordingly, the shelf controller 730 for the shelf 130 may recognize each of the cells via an identifier assigned to the cell (e.g., a cell identifier). Additionally, or alternatively, the shelf controller 730 may recognize the borders of each cell via an identifier assigned to each border (e.g., a border identifier). A border for a cell is understood to be the space, edge, and/or the like between the cell and an adjacent cell. Therefore, each cell is generally understood to have two borders.

In some embodiments, the shelf 130 may be configured with some type of sensor such as a Hall effect sensor; a physical switch, such as a reed switch; a force or pressure sensor, such as a force-sensitive resistor; an optical sensor, such as a photoeye; or other similar sensors that will be familiar to one skilled in the art to detect an object being placed on the shelf 130. For example, the shelf 130 may be configured with one or more sensors that are associated with each cell of the shelf 130. Therefore, when an object is placed on the shelf 130, the shelf controller 730 may receive signals from the sensors corresponding to the cells where the object has been placed and as a result, may recognize where (e.g., a position) on the shelf 130 that the object has been placed.

Additionally, or alternatively, the shelf 130 may be configured with one or more sensors to detect the placement of dividers 140 on the shelf 130. For example, the dividers 140 may be positioned along the shelf 130 so that a divider 140 is generally aligned with a border of a cell, and consequently an edge of a corresponding door 120. Here, one or more sensors may be associated with each border of the cell. Therefore, when dividers 140 are positioned along the shelf 130 at borders of one or more cells to define a storage compartment for storing an object, the shelf controller 730 may receive signals from the sensors corresponding to the borders where the dividers 140 have been placed and as a result, may recognize where (e.g., a position) on the shelf 130 that the object has been (or is to be) placed.

In embodiments in which spring-down dividers are used, one or more sensors may be associated with each spring-down divider. Here, when an object is placed on the shelf 130, the shelf controller 730 may receive signals from the sensors associated with those spring-down dividers that have been compressed by the object to essentially lay flat against the shelf 130. As a result, the shelf controller 730 may recognize where (e.g., a position) on the shelf 130 that the object has been placed.

The shelf controller 730 for a shelf 130 may use signals received from sensors associated with cells, borders of cells, dividers, and/or any combination thereof in identifying where (e.g., a position) an object has been placed on the shelf 130. In addition, the shelf controller 730 may generate location data for the object identifying where the object has been placed on the shelf 130. For example, the shelf controller 730 may generate location data identify the shelf (e.g., a shelf identifier), as well as the cells (e.g., cell identifiers) associated with the location on the shelf 130 where the object has been placed. Additionally, or alternatively, the shelf controller 730 may generate location data identifying the borders of cells (e.g., border identifiers) where the dividers 140 are located defining the storage compartment used for storing the object on the shelf 130.

Further, in some embodiments, the shelf controller 730 may provide an indication that is visible on the rear (e.g., the object inlet side) of the storage system 100 of the location where the object is stored on shelf 130. For example, the storage system 100 may be configured to have an indicator, such as a lighting element, provided on the rear of the storage system 100 for each cell of a shelf 130. Here, the shelf controller 730 may cause the lighting elements associated with the cells of the shelf 130 where the object is stored to illuminate to indicate where on the shelf 130 the object has been placed. Such a feature may be helpful in instances where the storage system 100 includes doors on the rear of the storage system 100 and an individual cannot readily look at the interior of the shelf 130 to determine what space on the shelf 130 is already occupied with (e.g., storing) objects.

In some instances, the indicators may be displayed with a certain configuration to indicate whether the associated cells (e.g., shelf space thereof) are or are not currently occupied with an object. For example, the lighting elements may be configured to illuminate a first color (e.g., green) when the associated cells are not currently occupied with an object. The shelf controller 730 may then cause the cells to illuminate a second, different color (e.g., red) once the associated cells become occupied with an object. Such a configuration may allow for an individual who is loading objects into the storage system 100 to more quickly identify where space is available on a shelf 130 to store an object.

In various embodiments, the load controller 740 and shelf controller 730 provide the identifying data and location data for the object stored in the storage system 100 to the system controller 710. In turn, the system controller 710 may combine the identifying data and the location data into, for example, object data, and store the object data locally. For example, the system controller 710 may include non-volatile memory in which the system controller 710 stores the object data. Additionally, or alternatively, the storage system 100 may be associated with some type of storage medium that may be installed as part of the storage system 100 or within the environment in which the storage system 100 operates. Here, the system controller 710 may store the object data in the storage medium.

Additionally, or alternatively, the system controller 710 may communicate the object data over a network 720 to a remote system such as a production system 770. In some embodiments, the system controller 710 may communicate the object data to the production system 770 for the purpose of having the production system 770 store the object data. In some embodiments, the system controller 710 may communicate the object data to the production system 770 for the additional or alternative purpose of having the production system 770 process the object data in performing tasks associated with the object data.

For example, the production system 770 may generate a communication (e.g., email, text message, etc.) that is sent to an individual informing him or her that the object is available through the storage system 100. In addition, the production system 770 may include information in the communication that can be used in retrieving the object from the storage system 100. For example, the production system 770 may include a code that the individual can enter or scan into a keypad or scanner to have the storage system 100 dispense the object.

The control system architecture 700 may further include a dispense controller 750. Like the other controllers, the dispense controller 750 may be installed as part of the storage system 100 or within the environment in which the storage system 100 operates. In various embodiments, the dispense controller 750 assists in dispensing objects from the storage system 100.

When an object is to be dispensed from the storage system 100, the dispense controller 750 in particular embodiments receives identifying data for the object. In some embodiments, the storage system 100 may include some type of mechanism such as a keypad, barcode scanner, optical scanner, and/or the like to allow an individual to enter the identifying data for the object that the individual would like to retrieve from the storage system 100. For example, the individual may enter a numeric code associated with the object into the keypad or may scan a QR code associated with the object using the optical scanner.

In other embodiments, the dispense controller 750 and/or the system controller 710 may receive the identifying data for the object over a network 720 from a remote system such as a production system 770. For example, the production system 770 may be a part of a logistics network for a package carrier. The package carrier may be using the storage system 100 for storing, transporting, and dispensing packages for delivery to final destinations. Here, the storage system 100 may be operating in an autonomous fashion in dispensing objects based at least in part on instructions received from the production system 770. Therefore, the production system 770 may communicate over the network 720 with the dispense controller 750 and/or the system controller 710 to provide the identifying data for the object to dispense from the storage system 100.

In other embodiments, the dispense controller 750 may receive the identifying data for the object from another source such as, for example, a mobile robotic platform 630. Again, the storage system 100 may be operating in an autonomous fashion in dispensing objects based at least in part on instructions received from the mobile robotic platform 630. Therefore, the mobile robotic platform 630 may communicate with the dispense controller 750 over a network 720 to provide the identifying data for the object.

The dispense controller 750 may forward the identifying data for the object to the system controller 710. In turn, the system controller 710 may use the identifying data for the object in identifying the location where the object is stored in the storage system 100. For example, the system controller 710 may use the identifying data in retrieving the object data for the object. The system controller 710 may then use the object data in identifying the shelf 130 (e.g., shelf identifier) on which the object is stored, as well as the cells of the shelf 130 (e.g., cell identifiers and/or border identifiers) on which the object is located.

The system controller 710 may then send a command (e.g., one or more signals) to the shelf controller 730 for the shelf 130 where the object is stored. The command may identify the cells (e.g., cell identifiers and/or border identifiers) where the object is located (e.g., positioned). Upon receiving the command, the shelf controller 730 may have the series of doors corresponding to the cells of the shelf 130 where the object is located open so that the object can be dispensed from the storage system 100. For example, the shelf controller 730 may actuate the release mechanisms for each of the doors so that the doors open and/or can be opened to dispense the object.

The control system architecture 700 may further include a human-machine interface 760 configured to allow individuals to interact (e.g., configure, monitor, view data, etc.) with the various controllers, sensors, memory, and/or the like that make up the control system architecture 700. For example, the human-machine interface 760 may allow for an individual to setup network credentials for the system controller 710 to interface with a production system 770, set sensitivity configurations for one or more sensors, view object data on various objects currently stored by the storage system 100, and/or the like.

Certain aspects of the control system architecture 700 may take the form of hardware or software or a combination of hardware and software. For example, certain aspects of the control system architecture 700 may take the form of a computer program that includes computer-executable instructions embodied on one or more non-transitory computer-readable media. Additionally, or alternatively, certain aspects of the control system architecture 700 may take the form of a hard-coded implementation into the mechanical design of computing components and/or may be built into embodiments of computing hardware as described herein.

Computer-executable instructions embodied on one or more non-transitory computer-readable media may include applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable media include all computer-readable media (including volatile and non-volatile media). However, computer-executable instructions are not embodied on transitory computer-readable media.

For example, a non-volatile computer-readable medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various embodiments are described to use a computer-readable storage medium, other types of computer-readable storage media may be substituted for or used in addition to the computer-readable storage media described above.

Figure 8:
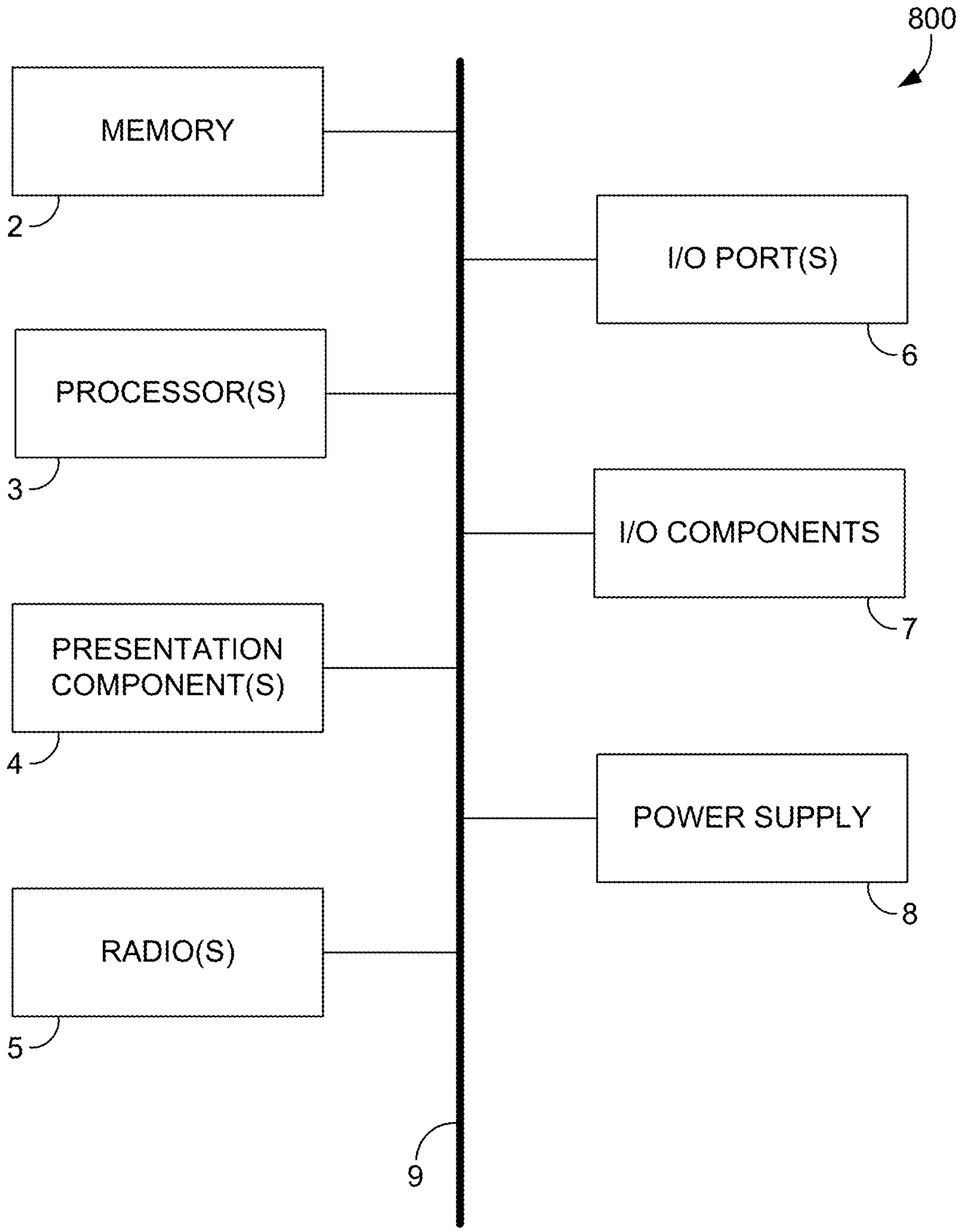
FIG. 8 depicts example computing hardware suitable for supporting the operation of various embodiments of the present disclosure.

Turning to FIG. 8, a block diagram of an example computing hardware 800 suitable for supporting different operations described herein in relation to the control system architecture 700. For example, the computing hardware 800 may be a system controller 710, a shelf controller 730, a load controller 740, and/or a dispense controller 750 as described in FIG. 7. It should be understood that although some components in FIG. 8 are shown in the singular, they may be plural, and the components may be connected in a different, e.g., local or distributed, configuration. For example, the computing hardware 800 may include multiple processors and/or multiple memories. As shown in FIG. 8, the computing hardware 800 includes a bus 9 that directly or indirectly connects different components together, including memory 2, processor(s) 3, presentation component(s) 4 (if applicable), radio(s) 5, input/output (I/O) port(s) 6, input/output (I/O) component(s) 7, and power supply 8.

The memory 2 may take the form of the memory components described herein. Thus, further elaboration will not be provided here, but the memory 2 may include any type of tangible medium that is capable of storing data (e.g., information). In addition, the memory 2 may include a data structure such as a database that stores a collection of records, data, and/or other information associated with storing and dispensing objects from a storage system 100 as described herein. In addition, the memory 2 may store a set of computer-executable instructions that, when executed, perform different functions or operations described herein. The computer-executable instructions may be referred to as "instructions," a "module," and/or an "application" for short. The processor(s) 3 may be one or more processors that receive instructions and process them accordingly. The presentation component 4 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or a lighted keyboard).

The radio 5 may support communications over one or more networks 720 and may additionally or alternatively support or facilitate different types of wireless communications, such as Wi-Fi, WiMAX, LTE, Bluetooth, and/or VOIP communications, among other communication protocols. In various aspects, the radio 5 may be configured to support multiple technologies, and/or multiple radios may be configured and utilized to support multiple technologies.

The input/output (I/O) ports 6 may take a variety of forms. Example I/O ports may include a USB jack, a stereo jack, an infrared port, and/or other proprietary communication ports. The input/output (I/O) components 7 may comprise one or more keyboards, microphones, speakers, touchscreens, and/or any other item useable to directly or indirectly input data into the computing hardware 800. The power supply 8 may include electrical sources, batteries, generators, fuel cells, and/or other components that may act as a power source to supply power to the computing hardware 800 and/or to other components described herein.

Loading Module

Figure 9:
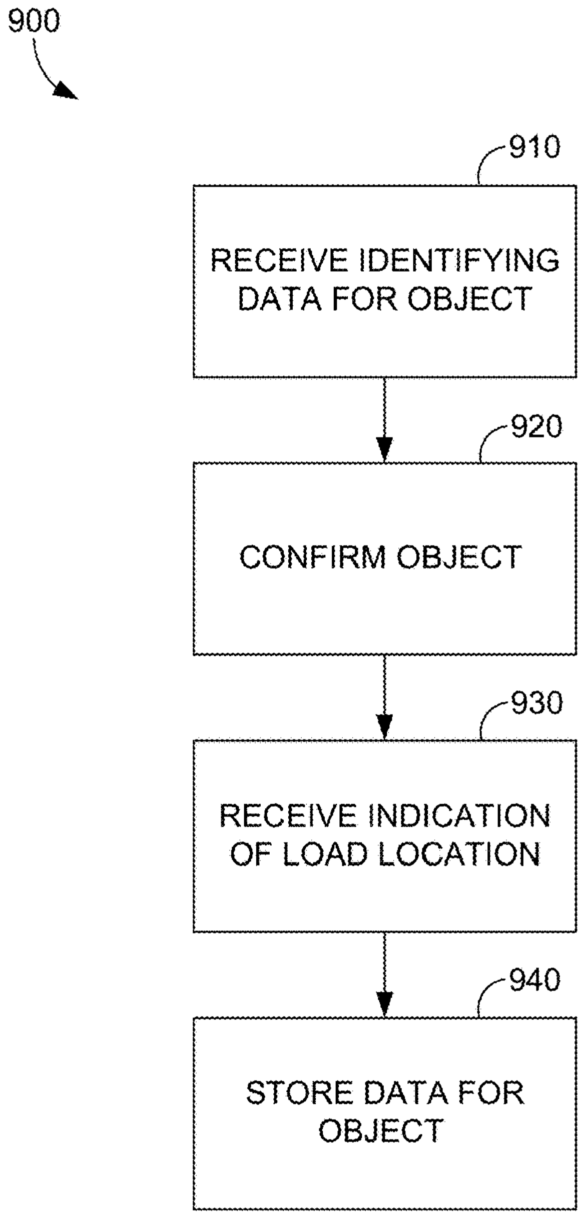
FIG. 9 depicts an example of a process for loading an object into a storage system in accordance with various embodiments of the present disclosure.

Turning now to FIG. 9, additional details are provided regarding a loading module used for loading an object into the storage system 100 in accordance with various embodiments. Accordingly, the flow diagram shown in FIG. 9 may correspond to operations carried out, for example, by computing hardware 800 such as the system controller 710 found in the control system architecture 700 as described herein, as the computing hardware 800 executes the loading module.

As previously discussed, an individual may wish to load an object into the storage system 100. Here, the storage system 100 may provide the individual with some type of mechanism to facilitate the individual providing the identifying data for the object to be loaded. For example, the storage system 100 may provide a barcode scanner that the individual uses to scan a barcode associated with the object (e.g., a barcode displayed on a label attached to the object) to provide the identifying data for the object. The barcode scanner may be in communication with a load controller 740 that sends the identifying data to the system controller 710.

Therefore, the process 900 involves the loading module receiving the identifying data for the object in Operation 910. The identifying data may include different forms of data to identify the object. For example, the identifying data may include a unique object identifier for the object in the form of a unique shipping number printed on a shipping label attached to the object. In another example, the identifying data may be a unique object identifier for the object in the form of a unique serial number printed on the object during the manufacturing of the object.

In Operation 920, the loading module confirms the object is to be stored in the storage system. For example, the object may involve a parcel being shipped through a shipping carrier to a delivery destination. Here, the loading module may send a communication having at least a portion of the identifying data to a production system 770 for the shipping carrier to confirm that the parcel is to be stored in the storage system 100 as part of the shipping route to be used in shipping the parcel to the delivery destination. In turn, the production system 770 may return a communication confirming that the parcel is to be stored in the storage system 100 as part of the shipping route to the delivery destination. In addition, the production system 770 may provide additional information along with the confirmation such as, for example, the delivery destination, who is authorized to take delivery of the parcel, and/or the like.

In another example, the object may involve medical supplies that are needed for a particular department in a hospital. Here, the storage system 100 may be located on a certain floor of the hospital and is used to dispense medical supplies that are needed on the floor. Therefore, the loading module may send a communication having at least a portion of the identifying data to a production system 770 (e.g., inventory system) for the hospital to confirm that the particular department operates on the certain floor use the medical supplies that are to be loaded into the storage system 100. In turn, the production system 770 may return a communication confirming that the medical supplies are being loaded into the correct storage system 100.

In some embodiments, the loading module may provide the individual who is loading the object with some type of indication as to whether the object has been confirmed or not for loading into the storage system 100. For example, the loading module may cause the mechanism used by the individual in providing the identifying data for the object to display a certain signal (e.g., illumination of a green light or a red light) and/or produce a certain sound (e.g., sounding of a positive "bing" or a negative "buzz") to indicate whether the object has been confirmed to be loaded into the storage system 100.

Additionally, or alternatively, the loading module may facilitate having a door on the rear of the storage system 100 opened upon confirming the object is to be loaded into the storage system 100, so that the individual will have access to the storage system 100 to load the object. The loading module may identify which door to open by determining where space is available in the storage system 100 to store the object. For example, the identifying data for the object may also include dimensions of the object. The loading module may use the dimensions in identifying a space that is available in the storage system 100 and is an appropriate size for storing the object. The loading module may then facilitate having the door opened for the identified space.

If the object is confirmed for loading into the storage system 100, the individual may then proceed with loading the object onto a shelf 130 of the storage system 100. In doing so, the individual may place the object onto the shelf 130 at a certain position on the shelf 130 that is available. In addition, the individual may position one or more dividers 140 to define a storage compartment to store the object. As a result, a shelf controller 730 for the shelf 130 may receive one or more signals from sensors indicating where on the shelf 130 the object has been placed. For example, the shelf controller 730 may receive one or more cell identifiers and/or border identifiers corresponding to the cells of the shelf 130 where the object has been placed. The shelf controller 730 may then send the location data comprising, for example, a shelf identifier for the shelf 130 and the cell identifiers and/or border identifiers to the system controller 710.

As a result, the loading module receives the location data identifying where the object has been loaded into the storage system 100 in Operation 930. In particular embodiments, the loading module combines the identifying data and location data for the object to generate object data and stores the object data in Operation 940. For example, the loading module may store the object data locally so that the object data is readily available to the system controller 710. Additionally, or alternatively, the loading module may communicate the object data (or portion thereof) to the production system 770. For example, as previously discussed, the loading module may communicate the object data to the production system 770 so that the production system 770 can store the object data and/or perform one or more tasks based at least in part on the object data.

Dispensing Module

Figure 10:
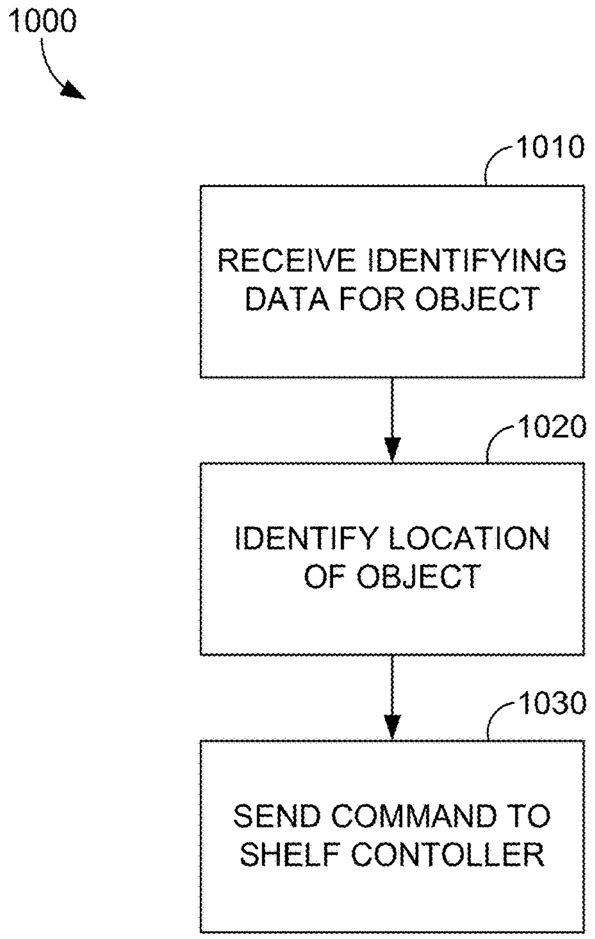
FIG. 10 depicts an example of a process for dispensing an object from a storage system in accordance with various embodiments of the present disclosure.

Turning now to FIG. 10, additional details are provided regarding a dispensing module used for dispending an object from the storage system 100 in accordance with various embodiments. Accordingly, the flow diagram shown in FIG. 10 may correspond to operations carried out, for example, by computing hardware 800 such as the system controller 710 found in the control system architecture 700 as described herein, as the computing hardware 800 executes the dispensing module.

A dispense controller 750 or the storage system 100 may receive identifying data from one of various sources for an object that is currently stored in the storage system 100 and is requesting to be dispensed from the storage system 100. For example, the dispense controller 750 may receive the identifying data for the object via an individual using a mechanism associated with the storage system 100 such as a keypad, barcode scanner, optical scanner, and/or the like to enter the identifying data. In another example, the dispense controller 750 may receive the identifying data for the object via a production system 770, a mobile application, or via a mobile robotic platform 530 that communicates the identifying data over a network 720 to the dispense controller 750.

Accordingly, the dispense controller 750 sends the identifying data for the object to the system controller 710, and the system controller 710 makes the identifying data available to the dispensing module. Therefore, the process 1000 involves the dispensing module receiving the identifying data for the object in Operation 1010.

In Operation 1020, the dispensing module identifies the location where the object is stored in the storage system 100. In some embodiments, the storage system 100 may store the object data for the various objects locally. For example, the storage system 100 may store the object data in non-volatile memory that is a part of the storage system 100 or in some type of storage media that may be found within the environment in which the storage system 100 operations. Therefore, the dispensing module may query the object data for the object that is stored locally based at least in part on the identifying data for the object.

In other embodiments, the storage system 100 may store the object data for the various objects remotely. For example, the storage system 100 may store the object data via a production system 770 that is remote from the environment in which the storage system 100 operates. Here, the dispensing module may send a communication to the production system 770 that includes at least a portion of the identifying data for the object and requesting the object data (or portion thereof) for the object. In turn, the production system 770 returns the object data in a second communication to the dispensing module.

As previously discussed, the object data for the object may comprise location data, and the location data may include a shelf identifier of a particular shelf 130 on which the object is stored. In addition, the location data may include one or more cell identifiers and/or border identifiers that correspond to one or more cells of the particular shelf 130. Therefore, in Operation 1030, the dispensing module sends a command (e.g., one or more signals) to the shelf controller 730 for the particular shelf 130 requesting the shelf controller 730 to open the series of doors corresponding to the one or more cells so that the object can be dispensed. Accordingly, the shelf controller 730 receives the command and as result, sends one or more signals to the release mechanisms associated with the doors 120 found in the series of doors to open so that the object is dispensed from the storage system 100.

Embodiment 1: A storage system comprising: a frame comprising a shelf; a plurality of doors attached to the frame along a dispensing side, wherein each door of the plurality of doors can be opened and closed independently through operation of a corresponding release mechanism; a plurality of dividers adjustable to different positions along a length of the shelf to thereby define storage compartments that vary in size along the length of the shelf for storing objects of different sizes; and a controller that, for each storage compartment, is configured to cause operation of the corresponding release mechanism for a series of the plurality of doors corresponding to a dimension of the storage compartment in unison to release an object stored in the storage compartment.

Embodiment 2: The storage system of embodiment 1, wherein the shelf is angled relative to a surface on which the frame is supported downward in a direction of gravity.

Embodiment 3: The storage system of embodiment 1 or 2, wherein the frame is open along an object inlet side that is opposite the dispensing side to allow the objects to be loaded into the storage compartments.

Embodiment 4: The storage system of embodiment 3, further comprising a plurality of differently sized, externally accessible locking doors on the object inlet side.

Embodiment 5: The storage system of any of embodiments 1 to 4, wherein the corresponding release mechanism for a door of the plurality of doors is located above the door, and the corresponding release mechanism comprises a solenoid configured to move in a direction to kick open a top finger of the door to allow the door to swing open.

Embodiment 6: The storage system of embodiment 5, wherein the solenoid actuates a mechanism attached to the solenoid to force the door open.

Embodiment 7: The storage system of any of embodiments 1 to 6, wherein the storage system is coupled to a repositioning system comprising actuated tracks on which the storage system sits and can be driven to open space for the series of the plurality of doors over a first conveyor mechanism to dispense the object onto the first conveyor mechanism.

Embodiment 8: The storage system of embodiment 7, wherein the first conveyor mechanism is configured to carry the object to a second conveyor mechanism, and the second conveyor mechanism is configured to carry the object to a mobile robotic platform.

Embodiment 9: The storage system of any of embodiments 1 to 8, wherein the shelf is partitioned into a plurality of cells that align with the plurality of doors, and each of the plurality of cells is associated with a sensor such that, when the object is placed in the storage compartment, the controller receives at least one identifier of at least one cell from the plurality of cells corresponding to a position on the shelf where the object has been placed based at least in part on a signal received from the sensor for the at least one cell.

Embodiment 10: The storage system of embodiment 9, wherein the controller generates location data identifying the shelf and the at least one cell corresponding to the position on the shelf where the object has been placed.

Embodiment 11: The storage system of any of embodiments 1 to 8, wherein the shelf is partitioned into a plurality of cells that align with the plurality of doors, and a border of each of the plurality of cells is associated with a sensor such that, when each of two dividers of the plurality of dividers is positioned along the shelf at the border of a cell of the plurality of cells to define the storage compartment, the controller receives an identifier of the border based at least in part on a signal received from the sensor corresponding to the border.

Embodiment 12: The storage system of embodiment 11, wherein the controller generates location data identifying the border of the cell where each of the two dividers are positioned along the shelf to define the storage compartment.

Embodiment 13: A storage system comprising: a frame comprising a shelf; a plurality of doors attached to the frame along a dispensing side, wherein each door of the plurality of doors can be opened and closed independently through operation of a corresponding release mechanism; a plurality of spring-down dividers arranged along the shelf, wherein the plurality of spring-down dividers is configured such that when an object in stored on the shelf, for any spring-down divider of the plurality of spring-down dividers for which the object is placed on top of, a weight of the object compresses the spring-down divider down to essentially lay flat against the shelf, and for the spring-down dividers of the plurality of spring-down dividers that are immediately adjacent to where the object lies between the spring-down dividers serve to define a storage compartment in which the object is stored; and a controller that, for the storage compartment, is configured to cause operation of the corresponding release mechanism for a series of the plurality of doors corresponding to a dimension of the storage compartment in unison to release the object stored in the storage compartment.

Embodiment 14: The storage system of embodiment 13, wherein each of the plurality of spring-down dividers comprises a first end that is attached to the shelf and a second end that is free and comprising a mechanism to allow the spring-down divider to roll towards the dispensing side and essentially lay flat against the shelf.

Embodiment 15: The storage system of embodiment 13, wherein each of the plurality of spring-down dividers is configured such that the spring-down divider latches into position by a mechanism when compressed down to essentially lay flat against the shelf.

Embodiment 16: A method comprising: receiving, by a system controller, identifying data for an object to be stored in a storage system; sending, by the system controller, a communication having at least a portion of the identifying data to a production system; receiving, by the system controller, a communication confirming that the object is to be stored in the storage system; providing, by the system controller and based at least in part on the communication, an indication to an individual who is loading the object into the storage system that the object has been confirmed for storing in the storage system; receiving, by the system controller and from a shelf controller, location data comprising a shelf identifier for a shelf of the storage system on which the object has been placed and at least one of a cell identifier or border identifiers identifying a position on the shelf where the object has been placed, wherein the shelf controller is associated with the shelf and the shelf controller receives at least one signal from at least one sensor identifying at least one of the cell identifier or the border identifiers corresponding to at least one cell associated with the position on the shelf where the object has been placed; combining, by the system controller, the identifying data and location data to generate object data; and storing, by the system controller, the object data so that the object data is available to the system controller to use in dispensing the object from the storage system.

Embodiment 17: The method of embodiment 16, wherein providing the indication to an individual who is loading the object into the storage system that the object has been confirmed for storing in the storage system comprises at least one of causing a mechanism used by the individual in providing the identifying data to display a certain signal to indicate the object has been confirmed for storing in the storage system or facilitating having a door on the rear of the storage system opened for the position to allow the individual to load the object into the storage system at the position.

Embodiment 18: The method of embodiment 17, wherein the identifying data comprises dimensions of the object, and the method further comprises identifying, by the system controller and based at least in part on the dimensions, the position on the shelf is an appropriate size for storing the object.

Embodiment 19: The method of any of embodiments 16 to 18, further comprising: receiving, by the system controller and from a dispense controller, at least a portion of the identifying data for the object, wherein the dispense controller receives the portion of the identifying data as a result of a request for the object to be dispensed from the storage system; querying, by the system controller and based at least in part on the portion of the identifying data, the object data for the object from a storage medium; identifying, by the system controller and based at least in part on the object data, the shelf where the object has been placed; and responsive to identifying the shelf, sending, by the system controller and to the shelf controller, a command requesting the shelf controller to open a series of doors corresponding to the at least one cell associated with the position on the shelf where the object has been placed, wherein the shelf controller receives the command and as a result, sends at least one signal to release mechanisms associated with the series of doors to open so that the object is dispensed.

Embodiment 20: The method of embodiment 19, wherein the dispense controller receives the portion of the identifying data for the object via at least one of a second individual using a mechanism associated with the storage system to enter the identifying data, the production system, a mobile application, or a mobile robotic platform.

In some embodiments, this disclosure may include the language, for example, "at least one [element A] or [element B]." This language may refer to one or more of the elements. For example, "at least one of A or B" may refer to "A," "B," or "A and B." In other words, "at least one of A or B" may refer to "at least one of A and at least one of B," "at least A or B," or "A and B." In some embodiments, this disclosure may include the language, for example "[element A], [element B], and/or [element C]." This language may refer to either of the element or any combination thereof. In other words, "A, B, and/or C" may refer to "A," "B," "C," "A and B," "A and C," "B and C," or "A, B, and C."

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. A storage system comprising:

a frame comprising a shelf;

a plurality of doors attached to the frame along a dispensing side, wherein each door of the plurality of doors can be opened and closed independently through operation of a corresponding release mechanism;

a plurality of dividers adjustable to different positions along a length of the shelf to thereby define storage compartments that vary in size along the length of the shelf for storing objects of different sizes; and a controller that, for each storage compartment, is configured to cause operation of the corresponding release mechanism for a series of the plurality of doors corresponding to a dimension of the storage compartment in unison to release an object stored in the storage compartment.

2. The storage system of claim 1, wherein the shelf is angled relative to a surface on which the frame is supported downward in a direction of gravity.

3. The storage system of claim 1, wherein the frame is open along an object inlet side that is opposite the dispensing side to allow the objects to be loaded into the storage compartments.

4. The storage system of claim 3, further comprising a plurality of differently sized, externally accessible locking doors on the object inlet side.

5. The storage system of claim 1, wherein the corresponding release mechanism for a door of the plurality of doors is located above the door, and the corresponding release mechanism comprises a solenoid configured to move in a direction to kick open a top finger of the door to allow the door to swing open.

6. The storage system of claim 5, wherein the solenoid actuates a mechanism attached to the solenoid to force the door open.

7. The storage system of claim 1, wherein the storage system is coupled to a repositioning system comprising actuated tracks on which the storage system sits and can be driven to open space for the series of the plurality of doors over a first conveyor mechanism to dispense the object onto the first conveyor mechanism.

8. The storage system of claim 7, wherein the first conveyor mechanism is configured to carry the object to a second conveyor mechanism, and the second conveyor mechanism is configured to carry the object to a mobile robotic platform.

9. The storage system of claim 1, wherein the shelf is partitioned into a plurality of cells that align with the plurality of doors, and each of the plurality of cells is associated with a sensor such that, when the object is placed in the storage compartment, the controller receives at least one identifier of at least one cell from the plurality of cells corresponding to a position on the shelf where the object has been placed based at least in part on a signal received from the sensor for the at least one cell.

10. The storage system of claim 9, wherein the controller generates location data identifying the shelf and the at least one cell corresponding to the position on the shelf where the object has been placed.

11. The storage system of claim 1, wherein the shelf is partitioned into a plurality of cells that align with the plurality of doors, and a border of each of the plurality of cells is associated with a sensor such that, when each of two dividers of the plurality of dividers is positioned along the shelf at the border of a cell of the plurality of cells to define the storage compartment, the controller receives an identifier of the border based at least in part on a signal received from the sensor corresponding to the border.

12. The storage system of claim 11, wherein the controller generates location data identifying the border of the cell where each of the two dividers are positioned along the shelf to define the storage compartment.

13. A storage system comprising:

a frame comprising a shelf;

a plurality of doors attached to the frame along a dispensing side, wherein each door of the plurality of doors can be opened and closed independently through operation of a corresponding release mechanism;

a plurality of spring-down dividers arranged along the shelf, wherein the plurality of spring-down dividers is configured such that when an object in stored on the shelf, for any spring-down divider of the plurality of spring-down dividers for which the object is placed on top of, a weight of the object compresses the spring-down divider down to essentially lay flat against the shelf, and for spring-down dividers of the plurality of spring-down dividers that are immediately adjacent to where the object lies between the spring-down dividers serve to define a storage compartment in which the object is stored; and a controller that, for the storage compartment, is configured to cause operation of the corresponding release mechanism for a series of the plurality of doors corresponding to a dimension of the storage compartment in unison to release the object stored in the storage compartment.

14. The storage system of claim 13, wherein each of the plurality of spring-down dividers comprises a first end that is attached to the shelf and a second end that is free and comprising a mechanism to allow the spring-down divider to roll towards the dispensing side and essentially lay flat against the shelf.

15. The storage system of claim 13, wherein each of the plurality of spring-down dividers is configured such that the spring-down divider latches into position by a mechanism when compressed down to essentially lay flat against the shelf.

16. A method comprising:

receiving, by a system controller, identifying data for an object to be stored in a storage system;

sending, by the system controller, a communication having at least a portion of the identifying data to a production system;

receiving, by the system controller, a communication confirming that the object is to be stored in the storage system;

providing, by the system controller and based at least in part on the communication, an indication to an individual who is loading the object into the storage system that the object has been confirmed for storing in the storage system;

receiving, by the system controller and from a shelf controller, location data comprising a shelf identifier for a shelf of the storage system on which the object has been placed and at least one of a cell identifier or border identifiers identifying a position on the shelf where the object has been placed, wherein the shelf controller is associated with the shelf and the shelf controller receives at least one signal from at least one sensor identifying at least one of the cell identifier or the border identifiers corresponding to at least one cell associated with the position on the shelf where the object has been placed;

combining, by the system controller, the identifying data and location data to generate object data; and storing, by the system controller, the object data so that the object data is available to the system controller to use in dispensing the object from the storage system.

17. The method of claim 16, wherein providing the indication to the individual who is loading the object into the storage system that the object has been confirmed for storing in the storage system comprises at least one of causing a mechanism used by the individual in providing the identifying data to display a certain signal to indicate the object has been confirmed for storing in the storage system or facilitating having a door on the rear of the storage system opened for the position to allow the individual to load the object into the storage system at the position.

18. The method of claim 17, wherein the identifying data comprises dimensions of the object, and the method further comprises identifying, by the system controller and based at least in part on the dimensions, the position on the shelf is an appropriate size for storing the object.

19. The method of claim 16, further comprising:

receiving, by the system controller and from a dispense controller, at least a portion of the identifying data for the object, wherein the dispense controller receives the portion of the identifying data as a result of a request for the object to be dispensed from the storage system;

querying, by the system controller and based at least in part on the portion of the identifying data, the object data for the object from a storage medium;

identifying, by the system controller and based at least in part on the object data, the shelf where the object has been placed; and responsive to identifying the shelf, sending, by the system controller and to the shelf controller, a command requesting the shelf controller to open a series of doors corresponding to the at least one cell associated with the position on the shelf where the object has been placed, wherein the shelf controller receives the command and as a result, sends at least one signal to release mechanisms associated with the series of doors to open so that the object is dispensed.

20. The method of claim 19, wherein the dispense controller receives the portion of the identifying data for the object via at least one of a second individual using a mechanism associated with the storage system to enter the identifying data, the production system, a mobile application, or a mobile robotic platform.

* * * * *